United States Patent

[11] 3,599,180

[72] Inventors Richard B. Rubinstein
New York;
John O. Paivinen, Huntington; Leo Cohen, Commack, N.Y.; John Leland Seely, Salt Lake City, Utah; Attila Tetik, New York, N.Y.
[21] Appl. No. 780,005
[22] Filed Nov. 29, 1968
[45] Patented Aug. 10, 1971
[73] Assignee General Instrument Corporation
Newark, N.J.

[54] RANDOM ACCESS READ-WRITE MEMORY SYSTEM HAVING DATA REFRESHING CAPABILITIES AND MEMORY CELL THEREFOR
55 Claims, 19 Drawing Figs.

[52] U.S. Cl. .......... 340/173 R, 320/1
[51] Int. Cl. .......... G11c 11/40
[50] Field of Search .......... 340/173

[56] References Cited

UNITED STATES PATENTS

| | | | |
|---|---|---|---|
| 2,771,575 | 11/1956 | Hampton | 340/173 |
| 3,387,286 | 6/1968 | Dennard | 340/173 |
| 3,474,259 | 10/1969 | Rodgers | 307/238 |
| 3,479,528 | 11/1969 | Fisher | 307/238 |
| 3,480,795 | 11/1969 | Benson | 307/238 |
| 3,502,992 | 3/1970 | Cooperman | 340/173 |
| 3,503,049 | 3/1970 | Gilbert | 340/173 |

*Primary Examiner*—Terrell W. Fears
*Attorney*—James and Franklin

ABSTRACT: Means are provided in a memory system for refreshing stored data signals, said means being associated with the memory cell address circuitry provided for selecting the desired word location or address. Also disclosed is a novel three device memory cell defining each data storing location of the system, and a novel refresh amplifier used in the data refreshing mode of system operation. In one disclosed embodiment refreshing of the stored data is automatically effected during read and write operation by a novel address logic system.

INVENTORS
RICHARD B. RUBINSTEIN
JOHN O. PAIVINEN
LEO COHEN
ATTILA TETIK
JOHN LELAND SEELY
BY James and Franklin
ATTORNEY INVENTORS
RICHARD B. RUBINSTEIN
JOHN O. PAIVINEN
LEO COHEN
ATTILA TETIK
JOHN LELAND SEELY BY James and Franklin
ATTORNEY INVENTORS
RICHARD B. RUBINSTEIN
JOHN D. PAIVINEN
LEO COHEN
ATTILA TETIK
JOHN LELAND SEELY
BY James and Franklin
ATTORNEY INVENTORS
RICHARD B. RUBINSTEIN
JOHN O. PAIVINEN
LEO COHEN
ATTILA TETIK
JOHN LELAND SEELY
BY James and Franklin
ATTORNEY INVENTORS
RICHARD B. RUBINSTEIN
JOHN O. PAIVINEN
LEO COHEN
ATTILA TETIK
JOHN LELAND SEELY
BY James and Franklin
ATTORNEY INVENTORS
RICHARD B. RUBINSTEIN
JOHN D. PAIVINEN
LEO COHEN
ATTILA TETIK
JOHN LELAND SEELY
BY [signature]
ATTORNEY INVENTORS
RICHARD B. RUBINSTEIN
JOHN O. PAIVINEN
LEO COHEN
ATTILA TETIK
JOHN LELAND SEELY
BY James and Franklin
ATTORNEY INVENTORS
RICHARD B. RUBINSTEIN
JOHN O. PAIVINEN
LEO COHEN
ATTILA TETIK
JOHN LELAND SEELY
BY James and Franklin
ATTORNEY INVENTORS
RICHARD B. RUBINSTEIN
JOHN O. PAIVINEN
LEO COHEN
ATTILA TETIK
JOHN LELAND SEELY BY James and Franklin
ATTORNEY

RANDOM ACCESS READ-WRITE MEMORY SYSTEM HAVING DATA REFRESHING CAPABILITIES AND MEMORY CELL THEREFOR

The present invention relates generally to binary or digital memory systems, and particularly to a memory system of this type having data refreshing capabilities.

The data memory system is one of the basic components of any digital computer system and has as its primary function the storage of information, usually in bit or word form, at a plurality of locations or addresses. The data is commonly stored at the addresses at two discrete signal levels, corresponding to a logic "0" or "1," thereby to establish the two logical conditions utilized in digital information processing.

The memory system generally comprises a plurality of data storage elements arranged in a matrix defined by intersecting rows and columns, the address for each memory unit being defined by an intersection of a given row and a given column. In accordance with a predetermined program, which establishes the logical operation of the entire computer system, a word or bit is either read from a preselected address, or a new word is inserted into that selected address. The nature of the operation, (read or write) as well as the selected data address, is determined by logic circuitry receiving input data from the program input. The logic operation on the memory is generally performed in one of two manners, either by random access or by sequential addressing. In the former, the data at the selected addresses is interrogated in a random sequence, depending on the nature of the program, while in the latter the operations on the stored data are performed in a predetermined order, generally by interrogating the rows or columns in an ordered sequence.

For optimum effectiveness the memory system of a computer should be able to store a large number or density of words in a minimum volume so that the space requirement of the memory system may be relatively small without sacrificing the amount of data which can be stored therein. Furthermore, it is highly desirable that the read access time of the memory system be as low as possible to permit high-speed computer operation and that the system dissipate as little power as possible. Further desirable features of a memory system include reduced cost of the system during initial production and in its subsequent use, and that the readout of data from a selected address of the memory system be nondestructive, that is, the operation of reading a word from a selected address should not destroy the presence of that word at that address.

The known memory systems have utilized various types of data storage elements, such as magnetic cores arranged in a matrix, magnetic drums and magnetic discs upon which words are stored at preselected locations. Other types of storage elements which are less commonly employed in computer memories include flip-flops, shift registers, delay lines and cathode-ray tubes. While these known storage elements have been found to be generally effective as to their capabilities for storing data for ready access, they present problems and disadvantages with respect to their cost, complexity, access time, and/or power dissipation, and in addition they are difficult to fabricate.

In recent years, a new technology has been developed in which a plurality of switching devices are fabricated on an integrated circuit, that is, a circuit which can be substantially completely fabricated in a very small physical element such as a chip of semiconductor material. In the fabrication of these integrated circuit chips it has been found particularly effective to utilize field effect transistors (FET's) which are effective as high-speed switching devices. Field effect transistors include a control terminal generally termed the gate, and a pair of output terminals generally termed the source and drain respectively. When a suitable negative signal is applied to the gate, the circuit between the output terminals is closed, and when the signal at the gate is at a ground or positive potential, the output circuit between the source and drain is open. In a construction of a semiconductor chip containing a plurality of such field effect transistors, the chip substrate may be biased to any convenient reference potential. If a positive voltage is applied to the substrate material and to either the source or drain terminals of the field effect transistor, a ground level signal applied to the gate will be sufficiently negative with respect to that substrate potential to turn the transistor on. Thus, the field effect transistor operates as a switch which is controlled by the signal potential at its control or gate terminal.

However, design difficulties have arisen in connection with the use of transistors of this type in digital memory systems, thereby limiting the use of these transistors as memory elements in a memory system. In previous designs of memory cells utilizing field effect transistors, each cell required the use of eight transistors, four connected as flip-flops, and the other four being utilized for address logic operation. These eight transistors were required to establish the desired memory cell data logic operation while at the same time maintaining sufficient isolation between the transistors so as to operate the memory cell at a permissible signal-to-noise ratio. The presumed need for this relatively large number of transistors for each memory cell in a multiaddress memory system reduces the data storing density of the system and increases the cost, complexity and power dissipation of the system. Furthermore, and quite apart from the number of transistors employed, the data in a memory cell of the type under discussion is commonly stored on a capacitive element which may be either a discrete physical capacitor or a capacitor defined by the interelectrode capacitance between the gate and an output terminal. The data signal stored on this capacitor has a tendency to dissipate therefrom, thus producing an incorrect data signal level at the cell once a certain time has lapsed after data insertion. It has been found that the rate of dissipation of the data signal from the storing element in the cell is directly proportional to, inter alia, the ambient temperature of the memory system. As a result, it is necessary with memory cells of this type to provide means for periodically refreshing the data signals stored at the memory units so that the data signal level in each of the memory units will be reliable and indefinitely maintained. It should be noted at this point that with the exception of the cathode-ray tube storage element, where the logical condition at an address is defined by the presence or absence of a spot at a specified location on the light-producing surface of the tube, the need for constantly refreshing the data storing element has heretofore not generally been necessary. However, the great advantages of field effect transistors in memory units including facility of fabrication, increased density of data storage in a reduced volume system, and decreased power dissipation, makes the requirement for periodic data refreshing a relatively minor drawback.

The known methods for data refreshing have heretofor required the use of refresh logic circuitry completely separate and distinct from the normal address logic circuitry, thus greatly adding to the size and complexity of the memory system, and decreasing the density of the stored data in the system. Moreover, data storage in memory systems of this type is generally described as being "volatile," that is, data stored at the system address locations is commonly dissipated upon the occurrence of a system power failure, thereby requiring a complete renewal of the stored data, or the provision of an auxiliary, redundant power supply to take over for the failed supply in the event of a power failure. Each of these solutions greatly increases the cost and complexity of the system.

It is, therefore a prime object of the present invention to provide a memory system utilizing field effect transistors which substantially overcomes the disadvantages of the known memory systems of this type.

It is also a general object of the present invention to provide a memory system of the type described in which the number of switching devices required for use in each memory cell is reduced without impairment of functioning.

It is a further object of the present invention to provide a memory system in which an increased density of data storage is achieved and in which the power dissipation is reduced.

It is yet another object of the present invention to provide a memory system of the type described in which data refreshing is accomplished by the use of the existing addressing logic circuitry and signals.

It is a more specific object of the present invention to provide a memory system of the type described in which the data stored in a plurality of memory units is automatically refreshed during a read or write operation.

It is another object of the present invention to provide a memory system of the type described in which the data signals are refreshed without necessarily interrupting the operation of the memory system.

It is yet another object of the present invention to provide a memory system in which the memory cells and the associated address decoding logic are formed from devices which can be readily fabricated in an integrated circuit.

It is still another object of the present invention to provide a memory system in which stored data is retained and refreshed in the event of a failure of the basic system power supply.

It is a further object of the present invention to provide a memory system which can be utilized either in a random access or in a sequentially addressed mode, and when used in the latter mode does not require external refresh control circuitry.

It is still another object of the present invention to provide a refresh amplifier circuit for use in a memory system of the type described, which effectively regenerates the data signal level at the storing element in the system memory units.

To these ends, a memory system is described in which data is stored in memory cells or units arranged in a predetermined pattern to define an address for each memory unit. The data storing element in each memory cell has the characteristic that the data signal level tends to dissipate, so that data refreshing or data signal regeneration must be periodically performed. The present invention provides for such data refreshing by making use of the existing timing signals and address logic circuitry. Data refreshing may either be periodically controlled by an externally generated refresh signal or, as in one embodiment of the invention, may be automatically effected during a read or write cycle on those memory units in the addressed row or column, means being provided during a write operation to block the refreshed data from the particular unit in which new data is being inserted.

The present invention also provides a novel three switch device memory cell, the data storing element being connected between a reference potential source and the control terminal of one of said devices, the output circuit of which is connected in series with the output circuit of a second one of the switch devices between said reference source and a data output terminal. The third switch device has its output circuit connected between a data input line and the control terminal of the first mentioned switch device. Input signals are connected to the control terminals of the second and third switch devices to control the operation of the memory cell.

A refresh amplifier is connected between the output and data input terminals of the individual memory cells, and is effective when suitably actuated to transfer signal levels of the proper sense and at the nominal signal level to the data storing element in each of the memory cells being refreshed. For automatic refreshing during a read or write cycle, a novel circuit is provided which derives gating signals from the timing signals and the address select signals to control the operation of the three-device memory cell, which in conjunction with the refresh amplifier, produces the desired data refreshing.

To the accomplishment of the above, and to such other objects as may hereinafter appear, the present invention relates to a memory system, and memory storing, refreshing, and address circuitry used therein, as defined in the appended claims and as described in this specification, taken together with the accompanying drawings in which:

Figure 1A:
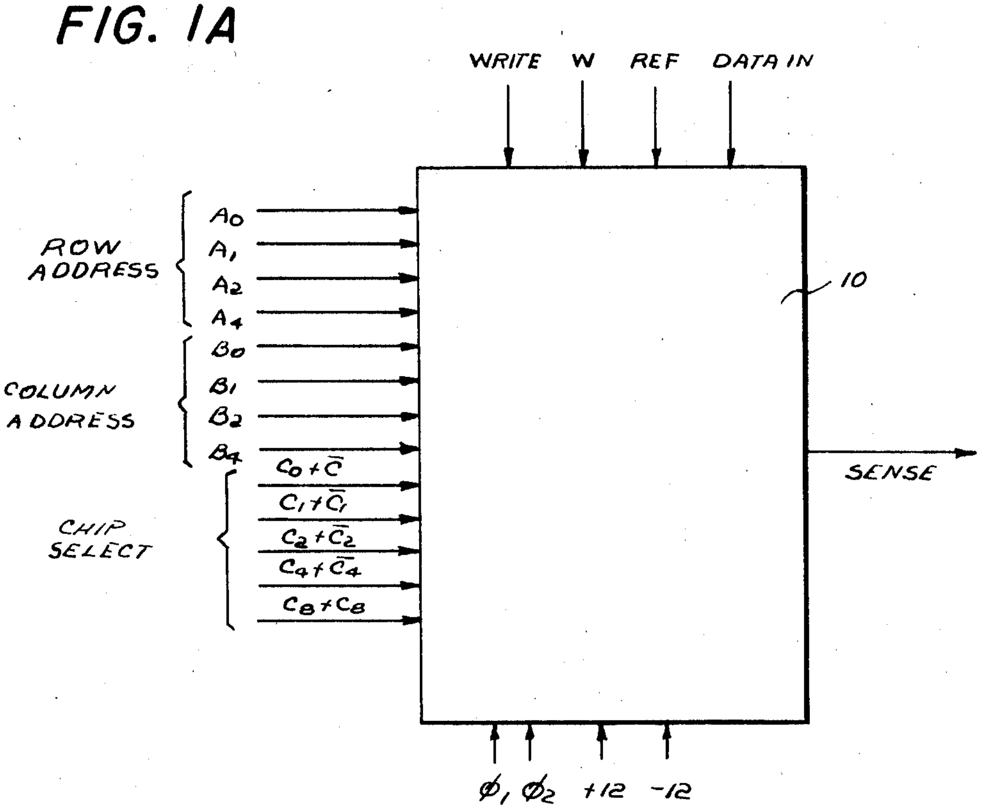
FIG. 1A is a schematic diagram of a first embodiment of the memory system of this invention, indicating the input signals to the system.

The present invention will be described with respect to two specific embodiments thereof, these embodiments being referred to herein as systems I and II for purposes of clarity of description. System I is illustrated in FIGS. 1—5 and system II is illustrated in FIGS. 6—10.

GENERAL SYSTEM OPERATION (I AND II)

In the disclosed memory systems, the storage and address decoding circuit elements constituting the system can be completely formed on a single chip of semiconductor material. If desired, a plurality of these chips may be connected together with suitable chip select circuitry to increase the total storage capacity of the system. Each of the individual chips comprise a plurality of memory cells each defining a word location, the cells being arranged in a predetermined manner, such as in intersecting rows and columns. Each location or address of a word or bit is uniquely defined by an intersection of a row and a column. Circuitry is provided for uniquely selecting one row and one column in accordance with row and column data input received from an external circuit, and if the system is formed of a plurality of chips, a decoding circuit is provided for selecting that particular chip at which the address or word location is located.

Data is stored in each memory cell in the form of either a logic "1" or "0" word or bit represented by one of two voltage levels. In operation in a computer with which the memory system is associated, a stored word is either read from a selected address or a new word is written or inserted into a specified address. During a write cycle, the information present on the data bit input line is routed to the specified address location and then stored therein for subsequent readout cycles. During a read cycle, the data stored at the specified location is transferred into a sense or data output line without destroying the signal level at the selected address.

The memory cells of systems I and II are in the form of a three-switching-device cell having a data storing element associated with one of the switching devices. As herein specifically disclosed, each of these switch devices is a field effect transistor, the associated address logic circuitry also being formed of field effect transistors, the entire system thus being readily fabricated onto a single semiconductor chip.

The storing element is in the form of a capacitive element which may be either a discrete physical capacitor or a capacitor formed in the semiconductor material. It has been found that the signal level stored on a capacitive element of this type tends to dissipate or leak from the element, so that it becomes necessary to periodically refresh or regenerate the signal level on that element. In accordance with this invention, the signal level on the data storage elements are periodically refreshed, the refreshing operation being performed by the utilization of the already provided address circuitry and timing signals. In both systems I and II, data refreshing of all the memory cells in either a single row or column is effected upon the receipt of an external refresh signal which operates through the row and column decoding circuitry so that during a refresh-cycle all elements within a single row or column in all chips are refreshed. The refresh cycle is sequentially performed on successive rows or columns so that upon the completion of a refresh sequence each memory cell of the memory system is refreshed, the cycle then beginning again, at an appropriate time, with the next row or column.

Systems I and II exemplify different approaches to the refreshing procedure, each having its advantages and disadvantages relative to the other but both representing improvements over the prior art.

In system I a separate refresh command, generated at predetermined intervals at an external refresh counter, is applied to the column select decoder circuitry to simultaneously enable all columns. At the same time, one row is uniquely selected and the data signals at the data storing elements in that selected row are transferred to a refresh amplifier connected between the output and input of the memory cell in each column, and then returned to that storing element so that the signal level stored on the storing element is regenerated or refreshed. The row selected during a data refresh cycle is sequentially varied so that eventually every row, and thus every memory cell in the system, is periodically refreshed.

In system II a separate refresh signal is not required for data refreshing. During a read cycle from a selected word address, the data signals at all memory cells within the selected row of that address are simultaneously and automatically refreshed. During a write cycle, information on the data bit input line is specifically routed to the selected row-column location and stored (written) therein, while the remaining memory cells in the selected row are automatically and simultaneously refreshed. If a separate refresh signal is provided, as in system I, thereby to produce a refresh cycle performed at predetermined intervals in addition to the refreshing obtained during normal read and write operations, in that refresh cycle a row is selected and all elements within that row are automatically refreshed as in a normal read operation. During each such externally controlled refresh cycle, a different row is selected and refreshed until each memory cell in each row is refreshed.

The invention will now be more specifically described first with respect to the organization of system I.

SYSTEM I GENERAL DESCRIPTION

In the memory system herein specifically disclosed 256 word or bit locations or addresses are arranged on a memory chip 10 in a square matrix or array defined by the intersection of sixteen rows and sixteen columns, each of the word locations being defined by an intersection of a row and a column. As illustrated in FIG. 1A, chip 10 receives row and column address input signals $A_0$—$A_4$ and $B_0$—$B_4$, applied respectively to row and column decoding circuitry contained in chip 10, which in turn produce unique row and column select signals corresponding to the input address, thereby to select that unique address. To expand the storage capacity of the system a plurality of chips 10 may be connected together with appropriate chip select circuitry also formed in the chips which receive chip select input signals and select one particular chip. As herein specifically disclosed, 32 such chips 10 are connected in this manner and chip select signals $C_0$—$C_8$ and their respective complements are applied to each chip 10 and processed by chip select decoding circuitry formed on the chip to thus select a unique chip for each addressing operation.

Figure 1B:
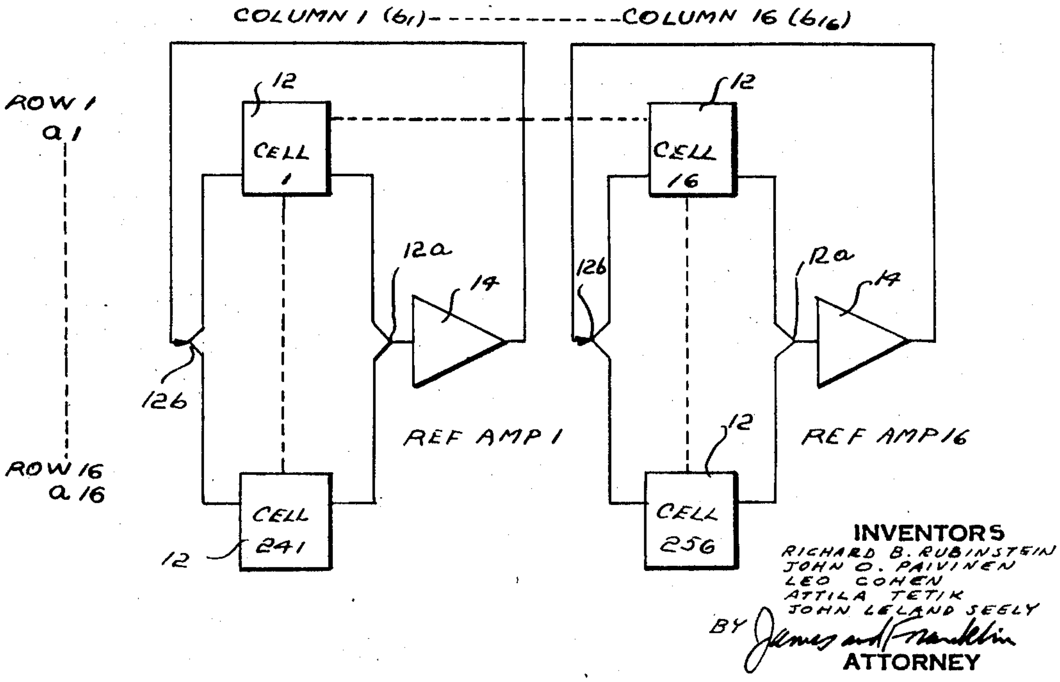
FIG. 1B is a schematic diagram illustrating the row and column arrangement of the memory cells and the connection of the refresh amplifiers between the various cells within a column.

FIG. 1B schematically illustrates the arrangement of a plurality of memory cells 12 formed in chip 10 and defining the basic component of each of the 256 word locations on each chip 10. The cells 12 are arranged in a row-column configuration as described above and a refresh amplifier generally designated 14 is provided in feedback circuit arrangement with each of the memory cells 12 within a given column connected between the output **12*a* of the memory cells 12 of a given column and the input 12*b* of those cells. A refresh amplifier 14** is provided in a similar feedback arrangement with the memory cells in each of the 16 columns.

Chip 10 is also connected to a pair of uniquely phased external clock signals $\Phi_1$ and $\Phi_2$, positive and negative voltage sources +12 and −12, and a number of external command signals, such as a write, refresh (REF), data input, (DATA IN) and strobe (W) signals. The timing and amplitude relations for these input signals received during the various system operations, i.e. read, write, and refresh, are illustrated in FIGS. 5A—D.

CLOCK GENERATOR I

The various memory and logic operations performed on chip 10 are controlled by four phase overlapping clocks capable of operating at speeds up to 5MHz. Two additional clock phases $\Phi'_1$ and $\Phi'_2$ are derived from the external clock phases $\Phi_1$ and $\Phi_2$, these four clock phase signals providing all the necessary timing signals for the operation of system I.

Figure 5A:
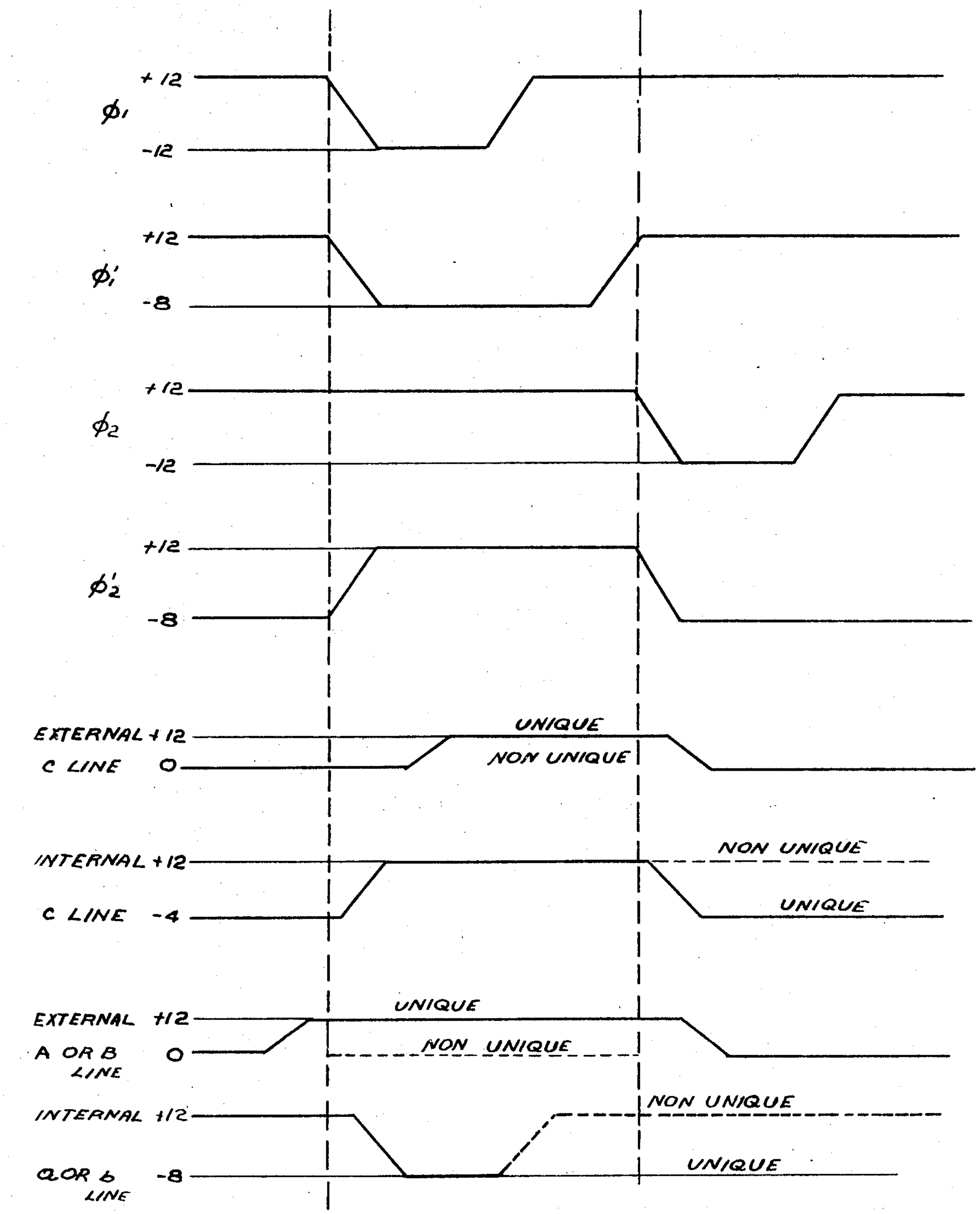
FIG. 5A is a timing diagram illustrating the time relationships between the system clock pulses and the row and column address signals.

The timing relationship between the external clock phases $\Phi_1$ and $\Phi_2$ and the internally generated overlapping clocks phases $\Phi'_1$ and $\Phi'_2$ are illustrated in FIG. 5A, time being represented on the horizontal axis and the signal amplitude being represented on the vertical axis. It is seen that clock phases $\Phi_1$ and $\Phi_2$ are normally at +12 volts, and are periodically changed to a −12 volt level. The negative portion of a clock phase is referred to as the "time" of that phase, which terminology will be used throughout this specification.

Figures 2A, 2B, 3A, 3B, 3C:
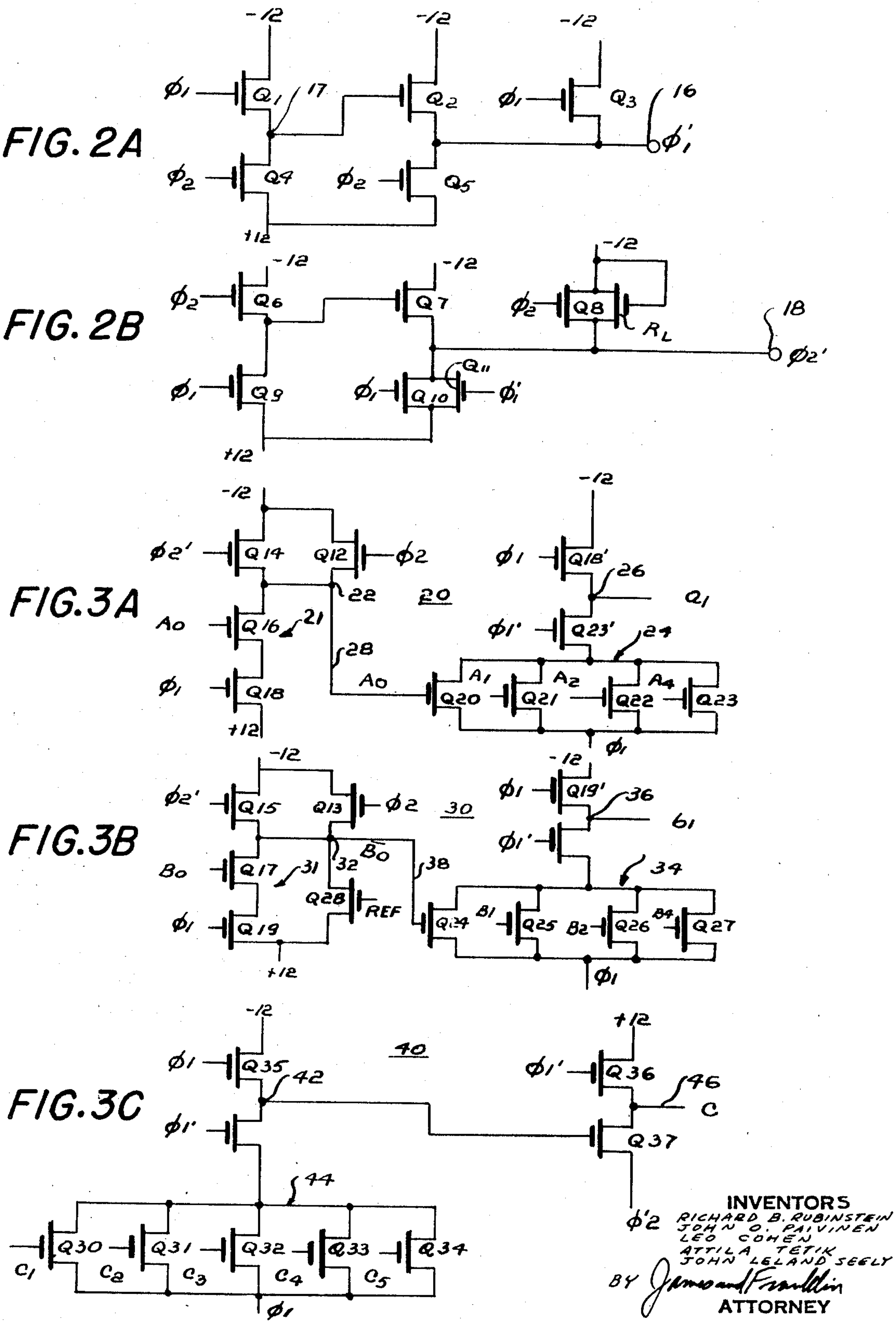
FIGS. 2A and 2B are circuit diagrams illustrating circuitry for obtaining the clock pulses of the system of FIG. 1A.
FIG. 3A is a circuit diagram of the row address decoding logic circuitry of the system of FIG. 1A.
FIG. 3B is a circuit diagram of the column address decoding circuitry of the system of FIG. 1A.
FIG. 3C is a circuit diagram of the chip select decoding circuitry of the system of FIG. 1A.

The overlapping clock phases $\Phi'_1$ and $\Phi'_2$ are generated from the external input clocks $\Phi_1$ and $\Phi_2$ by the circuits illustrated in FIG. 2A and FIG. 2B. As the description of the operation of these circuits is more completely described in a copending application Ser. No. 766,489, entitled, "Clock Generator" assigned to the assignee of the present invention and filed on Nov. 10, 1968, these circuits will be described herein in relatively brief fashion. The circuits comprise a plurality of interconnected switch devices in the form of field effect transistors (FET's) formed on chip 10. The external clock phases $\Phi_1$ and $\Phi_2$ are applied respectively to the control or gate terminals of FET's Q1 and Q4.

At $\Phi_1$ time FET's Q1, Q2 and Q3 are conductive and their output terminals are charged towards −12 volts. At this time FET's Q4 and Q5, which have clock phase $\Phi_2$ applied to their control terminals or gates, are cut off. During and at the end of $\Phi_1$ time the gate of FET Q2 and the $\Phi'_1$ output terminal 16 are negatively charged to within one threshold voltage of 12 volts, that is, to approximately −8 volts. As known to those familiar with the theory of operation of field effect transistors, a threshold voltage drop is developed in the output circuit between the source and drain of the field effect transistor. Thus, for example, when FET Q2 is conductive and the source is tied to a −12 volt line, there will be a voltage drop through the FET of approximately 4 volts, so that the drain will be charged to only approximately −8 volts. The gate of FET Q2 remains negatively charged even when clock phase $\Phi_1$ returns to its positive potential as it is connected to a node 17 between the output circuits of FET's Q1 and Q4, which is negatively charged during $\Phi_1$ time and which remains so charged so long as clock phase $\Phi_2$ is also positive, so that FET Q4 remains cut off. At $\Phi_2$ time FET Q4 is turned on and node 17 discharges towards +12 volts thereby removing the negative charge from the gate of FET Q2, to turn off the latter. Thus, FET Q2 continues, by connecting terminal 16 to a −12 volt source through its output circuit, to provide the necessary negative drive to preserve the −8 volt output level at terminal 16 in the period after clock phase $\Phi_1$ returns to a positive level until the time clock phase $\Phi_2$ becomes negative, thus defining at terminal 16 the overlapping clock phase $\Phi'_1$. The leading negative edge of clock phase $\Phi_2$ also turns on FET Q5 and thus applies through the now conducting output circuit of FET Q5 a + 12 volt signal to terminal 16, causing terminal 16 to charge towards +12 volts at the onset of $\Phi_2$ time to produce the positive going portion of $\Phi'_1$.

A similar circuit is shown in FIG. 2B in which a second overlapping clock phase $\Phi'_2$ is produced at an output terminal 18. The basic operation of the FIG. 2B circuit is substantially the same as that of the circuit of FIG. 2A except that the external clock phase inputs are reversed, clock phase $\Phi_2$ being applied to the control terminal of FET Q6 and clock phase $\Phi_1$ to the control terminal of FET Q9. During $\Phi_2$ time, FET's Q6, Q7, and Q8 are charged negatively thus applying a negative potential at the output terminal 18. Clock phase $\Phi'_2$, produced at terminal 18, remains negative until the negative going leading edge of clock phase $\Phi_1$ is applied to the control terminals of FET's Q9 and Q10, at which time a +12 volt signal is applied through the output circuit of FET Q10 to the control terminal of FET Q7 to maintain the latter in an off condition, and output terminal 18 is charged positive through the conducting output circuit of FET Q10.

For asynchronous operation it is essential that clock phase $\Phi'_2$ not leak towards the positive substrate potential and thus remain negative until the subsequent clock phase $\Phi'_1$ which may occur several microseconds thereafter in asynchronous system operation. For this reason the clock phase $\Phi'_2$ output terminal 18 is also connected through a high impedance resistance $R_L$ having a resistance value in excess of 100K, to a −12 volt source to prevent the clock phase $\Phi'_2$ from leaking positive towards the substrate potential during this interval. (The resistance $R_L$ can be defined by an FET whose gate is connected to its source and to a −12 volt source, that FET thus being continuously conductive at the specified high impedance). During $\Phi'_1$ time the clock phase $\Phi'_2$ output terminal 18 is operatively connected to a +12 volt source through the conducting output circuit of FET Q11, whose control terminal receives clock phase $\Phi'_1$ and charges terminal 18 towards +12 volt through its output circuit, thereby preventing the $\Phi'_2$ clock phase generated at terminal 18 from being pulled negative during $\Phi_1$ time because of the presence of the resistor $R_L$.

INITIAL DECODING I

The initial row and column decoding circuits 20 and 30 are shown in FIGS. 3A and 3B and have as their basic function the selection of unique row and unique column signals derived from the external row and column input data received at chip 10. The timing diagrams of the external row A and column B input signals and the internally derived row *a* and column *b* select signals are shown in FIG. 5A. The row and column decoders are substantially identical. Each comprises a four input NOR gate and means for forming the complement of the input row-column input signals and coupling that complement to one of the inputs of the NOR gate. In system operation the row or column address signal must be stable prior to the negative going leading edge of clock phase $\Phi_1$ and must remain stable at least until the beginning of $\Phi_2$ time so that the only time that the row and column external address data may change is between the end of $\Phi_2$ time and the beginning of the subsequent $\Phi_1$ time.

The input stages of the row and column decoding circuits 20 and 30 comprising FET's Q12—Q18 and Q13—Q19 respectively, respectively receive one bit (i.e. $A_0$ or $B_0$) of the row and column input data and form the complement thereof. The complemented input signal is then applied to the input gate of an input device of a NOR gate 24 and 34, the remaining input gates of the NOR gates 24, 34 comprising FET Q20—Q23 and FET's Q24—Q27 respectively, receiving the remaining row or column input signals or their respective complements. When all of the inputs to NOR gate 24, 34 are positive, the output signal at terminals 26, 36 will be negative to thus respectively represent the unique row or column select signal.

In a 16 row and column address array such as that specifically disclosed herein, 16 discrete row and column decoders respectively are required. Only one of the row decoders and one of the column decoders produces a unique negative output select signal corresponding to the row and column of the selected address. The outputs of the 15 other row and column decoders will be positive at that time. Prior to the operation of the row and column decoders 20, 30 clock phases $\Phi_1$ and $\Phi'_1$ and $\Phi_2$ are at +12 volts and clock phase $\Phi'_2$ is at −8 volts. The output points 22 and 32 of the input circuits 20 and 30 respectively, are negatively charged by clock phase $\Phi_2$ which transfers a −12 volt source through the output circuits of FET Q12 and FET Q13 to these points, at approximately −6 volts. Points 22 and 32 are also precharged negative during $\Phi'_2$ time, which negatively charges these points through the conducting output circuits of FET's Q14 and Q15 to maintain the negative charge at points 22 and 32 for the succeeding addressing operation. The row-column input signals $A_0$ and $B_0$ are applied to the control terminals of FET's Q16 and Q17 respectively and are complemented. Thus, assuming that $A_0$ or $B_0$ are both positive (+12 volts) FET's Q16 and Q17 are cut off and points 22 and 32 will remain negatively charged during the $\Phi_1$ sampling time and thereafter. If $A_0$ or $B_0$ are at ground potential, and thus negative with respect to the positively charged substrate, FET's Q16 and Q17 are turned on, points 22 and 32 will discharge to +12 volts through FET's Q18 and Q19 during $\Phi_1$ time. In either event, the complemented and uncomplemented address data signals are stable during $\overline{\Phi}_1$ $\Phi'_1$ time, that is, the latter half of $\Phi'_1$ time, and are operatively connected through leads 28 and 38 to the control terminal of FET's Q20 and Q24 respectively, which respectively define an input gate of NOR gates 24 and 34.

All row and column decoders 20, 30 precharge negatively at their terminals 26 or 36 respectively during $\Phi_1$ time through the action of FET's Q18' and Q19' respectively. The uniquely addressed row decoder remains negative at its output terminal 26 but the other 15 row decoders discharge to +12 volts during the latter half of $\Phi'_1$ time and remain at +12 volts until the next $\Phi_1$ time (FIG. 5A). This comes about through the action of the NOR gates 24 or 34. Discussing NOR gate 24 as exemplary, it will be conductive when any one of its inputs $\overline{A}_0$, $A_1$, $A_2$, and $A_4$ is negative. If the illustrated row is selected—if $A_0$ is negative and $A_1$, $A_2$ and $A_4$ are positive—all of the NOR gate inputs will be positive, and the NOR gate will not conduct. Hence during $\Phi'_1$ when FET Q23' is conductive, clock phase $\Phi_1$ will not be connected to terminal 26. On the other hand if some other row is selected one or more of signals $\overline{A}_0$ and/or $A_1$, $A_2$ and $A_3$ will be negative, the NOR gate will be conductive, FET Q23' will be conductive during $\Phi'_1$ time, and hence after $\Phi_1$ time point 26 discharges to +12 volts, the level of clock phase $\Phi_1$ at that time. The NOR gates in each of the row and column decoders 20, 30 will receive four unique signals formed from the four input row or column (A or B) lines and their internally generated complements. Thus one NOR gate will receive all four trues ($A_0$, $A_1$, $A_2$, and $A_4$) at its inputs, while another NOR gate will receive all four complements ($\bar{A}_0$, $\bar{A}_1$, $\bar{A}_2$ and $\bar{A}_4$) at its inputs. The remaining 14 NOR gates will receive the other permutations of the true and complemented row (or column) signals. It will be understood that the decoding circuits 20, 30 illustrated in FIGS. 3A and 3B represent only one of the 16 row and column decoders utilized in the initial row and column decoding operation.

The column decoders 30 operate in a substantially identical manner, with one significant difference—they comprise an additional switching device Q28 controlled by the Refresh command applied to its control terminal. It will be recalled that during the refresh cycle, all columns are to be enabled and simultaneously addressed. This requires that the 16 column or "*b*" decoder outputs be simultaneously enabled. During a refresh cycle all input signal B lines must be at +12 volts during $\Phi'_1$ time. This is externally accomplished by external circuitry associated with the Refresh command. In addition, the complemented B lines 38 are forced to +12 volts on the chip by means of FET Q28 being rendered conductive by the Refresh command (REF) which is at ground during a refresh cycle $\Phi_1$ time, operatively connecting point 32 to the +12 volt source. Thus, during a refresh cycle all inputs to the NOR gates 34 of each of the 16 column decoders 30 are positive, thereby producing negative or column enabling signals at the output terminals 36 of each of the column decoders 30.

During the refresh cycle all memory chips are also selected, all columns (*b* decoders) are simultaneously addressed, and the rows (*a* decoders) are sequentially addressed, one new row being addressed during each refresh cycle, the refresh command and the sequential row addressed being controlled by an external refresh counter and shift register (not shown) the design of which is well-known to those skilled in the computer art. Such external control circuitry may, for example, measure time or count the number of logic operations carried out and, when a predetermined point has been arrived at, produce the refresh command signal REF and then, through circuitry such as a shift register, sequentially address one row after the other until all rows have been addressed.

There are thus 16 row or "*a*" decoders 20, and 16 column or "*b*" decoders 30 for addressing the 256 memory cells on chip 10. There is also a chip or *c* decoder 40 (FIG. 3C) for each chip. The chip decoder 40 is in the form of a dynamic decoder exhibiting no DC dissipation. The 5-bit C input data lines and their complements are here shown as being made available external to the memory chip 10 and therefore no complementing of these inputs is required on the chip itself. The chip select bits are applied to the inputs of a chip select NOR circuit 44 comprising FET's Q30—Q34. Each chip decoder, located on each of the 32 chips, will receive one possible permutation of the C input lines and their complements. For purpose of illustration, the decoder circuit 40 of FIG. 3C is shown receiving the trues of all five C input lines $C_0$—$C_8$. Node 42 is charged negatively during $\Phi_1$ time through the connecting of −12 volts thereto through the output circuit of FET Q35 which is conductive during $\Phi_1$ time. The only time the C input lines may not change is during $\bar{\Phi}_1$ $\Phi'_1$ time (latter half of $\Phi'_1$). At the end of $\Phi_1$ time, node 42 of the uniquely addressed chip decoder will remain negatively charged as the conduction path through the now positive $\Phi_1$ clock phase to the NOR gate 44 is blocked by the presence of a positive signal at each of the inputs of the NOR gate 44, while the chip decoders associated with the remaining 31 memory chips will discharge, through at least one of the NOR gate FET's to which a negative signal is applied, to +12 volts provided by the $\Phi_1$ clock phase. The $\Phi'_1$ clock phase applied through the output circuit of FET Q36 to the *c* decoder output line 46 maintains the *c* decoder output at +12 volts for all of $\Phi'_1$ time. A negative signal at the uniquely addressed chip decoder is applied to the control terminal of FET Q37, which then transfers the $\Phi'_2$ clock phase through the output circuit of FET Q37 to output line 46. The resultant output of an addressed chip decoder is thus a signal at line 46 similar to clock phase $\Phi'_2$, i.e., +12 volts during $\Phi'_1$ time and negative thereafter until the next $\Phi_1$ time.

FINAL DECODING AND MEMORY CELL 12

The row, column and chip select signals which are derived from the *a*,*b* and *c* decoding circuits 20,30 and 40 are applied to final decoding circuitry operatively connected to the memory cell 12 in the selected row and column location or address in the selected chip. (FIG. 4) The cells 12 are merged at two levels. The first level merges all elements in a row associated with a particular column. Thus associated with column 1 (*b*1) are a single cell from each of rows 1 (*a*1) through 16 (*a*16). In addition the 16 column outputs are merged in an output driver to provide a single sense output.

Each word location or address comprises an individual memory cell 12 which, in accordance with this invention, is formed of only three electronic switching devices in the form of field effect transistors Q40, Q41 and Q42. Each memory cell 12 comprises a capacitive data storage element 50 which may be a discrete capacitor, a capacitance formed in the semiconductive material of chip 10, or the interelectrode capacitance of FET Q40. A signal input line 52 to the memory cell 12 is applied to one terminal of the output circuit of FET Q42, the other terminal of that output circuit being connected to the control or gate terminal of FET Q40 and to one end of the data storing capacitor 50, the other end thereof being connected to a reference potential line, here shown at +12 volts. The output circuits of FET's Q40 and Q41 are connected in series with one another, one end of the output circuit of FET Q41 being connected to an output terminal 54 while the other end of the output circuit of FET Q40 is connected to said +12 volt source. The gate terminals of FET's Q41 and Q42 receive timed control signals derived from the row, column and chip select signals applied to the final decoding circuitry.

In the following description of the operation of memory cell 12, it will be assumed that the selected word address is at row 1 and column 1 of chip 1 so that the internal *a*1, *b*1 and *c*1 signals are each negative and thus unique (FIG. 5A). Thus, the unique negative column select signal $b_1$ is applied to the control terminal of FET Q43, and the control terminal of FET Q44 receives the unique negative row select signal $a_1$. FET's Q43 and Q44 are thus rendered conductive, thereby to transfer the chip select signal $c_1$ through their serially connected output circuits and through the output circuit of FET Q45 (which is rendered conductive when its control terminal receives the negative going portion of the strobe command signal W (FIGS. 5B—5D), thereby to apply a negative signal to the gate terminal of FET's Q41, and Q42, which are thus rendered conductive at that time.

The signal level on the data storing capacitor 50 is negative for a logic "1" condition and ground for a logic "0" condition. For a logic "1" operation FET Q40 is rendered conductive, thus causing the +12 voltage signal to be conducted through its output circuit and through the output circuit of FET Q41 to the output terminal 54 of the memory cell 12. If, on the other hand, the signal level on capacitor 50 is ground for a logic "0" condition, FET Q40 is cut off and output terminal 54, which is charged negative during $\Phi'_1$ time through the output circuit of FET Q46, remains negative as its discharge path to the positive potential source through the output circuits of FET's Q40 and Q41 is then open. Thus for a logic "1" or negative signal at capacitor 50, a positive signal will be generated at output terminal 54, and conversely for a logic "0" or ground signal at capacitor 50, a negative signal is developed at terminal 54. Thus memory cell 12 acts as a data signal inverter and amplifier as the signal level at terminal 54 is proportional to the −12 and +12 volt sources, and is thus independent of the data signal level at capacitor 50. Signal input line 52 may carry either new data or refresh data which is applied to capacitor 50 through the output circuit of FET Q42 when the latter receives a negative address select signal at its control terminal, which it will do when $a_1$, $b_1$, $c_1$ and W are all simultaneously negative.

REFRESH AMPLIFIER 14

The data storage system elements in each of the memory cells 12 are periodically refreshed upon the receipt of an external refresh signal at chip 10 which enables each of the columns in each chip as described above. During a refresh cycle the signal level on each of the data storage capacitors 50 in a selected row are regenerated. To this end, the inverted data at the output terminal 54 of each memory cell 12 is transferred to the input of a refresher amplifier 14 through FET Q53 during $\Phi_2$ time. The refresh amplifier 14 is connected in feed back relationship between the output of each memory cell 12 and the input of that memory cell, amplifier 14 having an output terminal 56 connected to signal input line 52, and thus to the input of memory cell 12. Terminal 56 is precharged negatively during $\Phi_2$ time through FET Q48 and is maintained negative during $\Phi'_2$ time through FET Q49. The refresh amplifier 14 has an input switch device in the form of FET Q47 which receives the inverted data signal from the output of cell 12 via FET Q53. Refresh amplifier 14 is supplied with a pair of voltage sources providing signals at two levels corresponding to the nominal optimum signal levels for logic "1" and logic "0" data of the signal on data storing capacitor 50. As herein specifically disclosed the two levels are provided by a −12 volt supply and the $\Phi_2$ clock phase which is at +12 volts at the time of the operation of amplifier 14. The conductivity of input switch device FET Q47 is determined by the signal level at the output terminal 54 of the memory cell 12 so that if that signal is negative, corresponding to a ground level or logic "0" at capacitor 50, FET Q47 becomes conductive thus permitting terminal 56 to discharge to +12 volts provided by the $\Phi_2$ clock phase during the positive portion of the latter and during $\Phi'_2$ time. If the signal applied to the control terminal of FET 46 from terminal 54 is positive, corresponding to a negative or logic "1" at capacitor 50, FET Q47 is cut off and the discharge path of terminal 56 is closed, terminal 56 thus remaining negatively charged.

Thus, it will be seen that during a refresh operation the signal level at the data storing capacitor 50 is transferred from the memory cell 12 to the input switching FET Q47 of refresh amplifier 14. In response to the logic level of that transferred signal, a second signal will be developed at the output terminal 56 of amplifier 14 which is an inverted form of the memory cell output signal. That second signal, which is in phase with the stored data signal as a result of the double inversion, is then transferred or recirculated to the input of memory cell 12 and thus to the data storing capacitor 50. The transferred data signal is at a level corresponding to the nominal data signal level, that is the data signal level prior to its dissipation from capacitor 50. Thus, during each refresh operation the signal level at the data storing capacitor is regenerated or restored to its nominal or optimum level and is thus maintained at an operative level between succeeding refresh cycles.

WRITE CYCLE

A typical write operation of system I may be explained as follows, with reference to the write cycle timing diagram of FIGS. 5A and 5B. During $\Phi_1$ time all row and column decode signals are negative while the $C_1$ chip decode signal is at +12 volts. The W command is at −12 volts during all of $\Phi'_1$ time. Therefore, +12 volts is propagated through the output circuits of FET's Q43, Q44, and Q45 to the gate of FET Q42 and to each memory cell similarly associated with the other 255 word locations. This positive signal removes any negative trapped charge associated with previous addressing operations. At the end of $\Phi_1$ time the nonunique or nonselected row and column initial decode signals rapidly discharge to +12 volts prior to the end of $\Phi_1$ time, leaving those paths cut off with +12 volts thus being trapped on all 256 write address nodes. The unique or selected row-column decode signals remain negative. Assume that row $a_1$ and column $b_1$ are selected for having new data routed thereto. The unique $c_1$ line goes negative at the start of $\Phi'_2$ time and remains negative until the start of a new operation. The negative $c_1$ signal is propagated through the output circuit of FET's Q43 and Q44 to the gate of FET Q41. During a write operation, the write command is applied to the control terminals of FET Q50 and FET Q51, the output circuit of the latter being connected in series with the output circuit of FET Q52, the control terminal of which receives the complement of the Data input signal. The Write command, which changes during $\Phi_1$ time, thus discharges through the output circuit of FET Q50 after $\Phi_1$ time any previous data appearing on the output column node 57 operatively connected to the output terminal 54 of each memory cell 12 associated with a given column, and allows new data to be written into the newly addressed cell. Terminal 56 is precharged negatively during $\Phi_2$ time through FET Q48, and samples the data input during $\Phi'_2$ time via FET Q49'; hence the data input to the chip 10 must be stable during $\Phi_2$ time. If the $\overline{\text{Data}}$ signal applied to the gate of FET Q52 is +12 volts the output circuit of FET Q52 remains open so that the charge at terminal 56 remains negative. If the $\overline{\text{Data}}$ signal is negative, the output circuit of FET Q52 becomes conductive, thereby to operatively connect terminal 56 to the clock phase $\Phi_2$ and thus to discharge terminal 56 to +12 volts during $\overline{\Phi}_2$ $\Phi'_2$ time, i.e. the latter half of $\Phi'_2$ time when clock phase $\Phi_2$ is positive. The polarity of output terminal 56 is transferred to the enabled memory cell via Q42 when W, $a_1$, $b_1$, and $c_1$ are all negative.

READ CYCLE

Figures 5B, 5C, 5D:
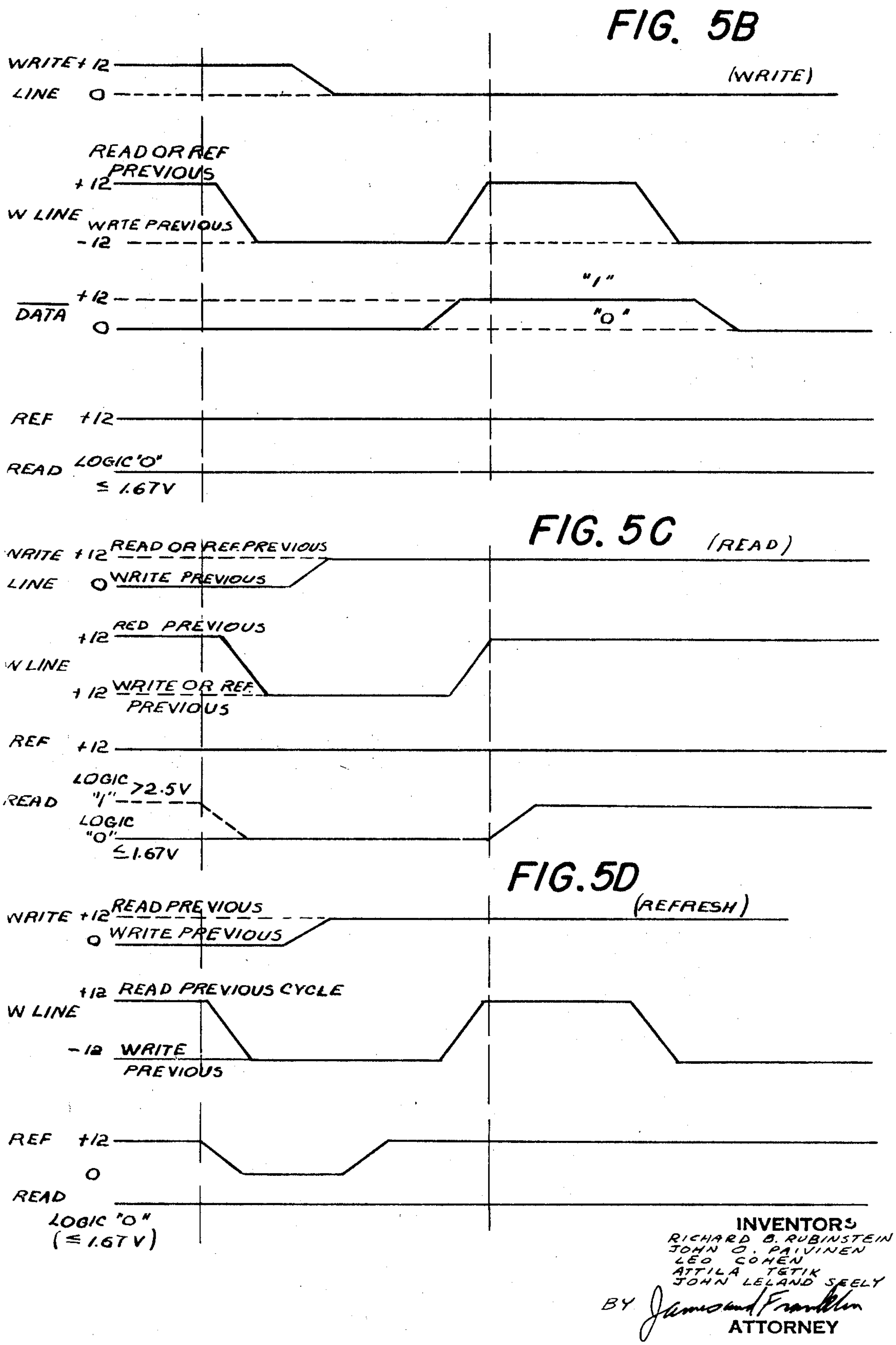
FIG. 5B illustrates various system signals for a write operation.
FIG. 5C illustrates the timing relation of the signals of FIG. 5B for a read operation.
FIG. 5D illustrates the timing relationship of these signals for a refresh operation.

The read cycle signal timing diagram is illustrated in FIG. 5C. The initial and final decoding logic are identical in both read and write cycles and the Write command signal is at +12 volts. Again it is assumed that the data stored at the memory cell at the row 1 column 1 address is to be read $a_1b_1$so that a negative signal is applied to the control terminal of FET Q41 by the row and column decoders. The output terminal 54 of each memory cell 12 in column 1 is operatively connected through a common column output line 55 and through the output circuit of FET Q53 to a column 1 output node 57. If the gate of FET Q40 is negative as a result of a negative logic "1" data signal stored on capacitor 50, node 57, which was initially negatively charged during $\Phi_1$ time through the output circuit of FET Q54 which receives the $\Phi_1$ clock phase at its gate, will discharge to +12 volts during $\Phi_2$ time through the output circuit of FET Q53 which is conducting at that time. When the stored word on capacitor 50 is positive, node 57 will remain negatively charged because FET Q40 is cut off thus blocking the discharge path of node 57 to the +12 volt source. Node 57 is connected by line 60 to a clocked inverter 62 associated with the uniquely addressed column. It will be noted that the node 57 outputs associated with the nonuniquely addressed or nonselected columns will be charged negative during the entire read cycle since they precharge during $\Phi_1$ time and have no discharge paths through the switching FET's in their memory cells. Thus the inverter outputs associated with the nonselected columns at the output driver stage will remain at +12 volts for the entire read cycle. However, the inverter 62 associated with the uniquely addressed column will invert its node 57 input—negative or positive depending on the status of the associated memory cell.

Inverter 62 comprises FET's Q55 and Q56. The control terminal of the former receives the signal from node 57 and has its output circuit connected to a +12 volt source. The control terminal of FET Q56 receives clock phase $\Phi_2$ and has its output circuit connected to −12 volts. The output signal of inverter 62, which is the complement of the signal at node 57, is applied via line 64 to the input of an output driver 66 which comprises a 16 input OR gate which precharges its output node 68 to +12 volts during $\Phi_1$ time, through the output circuit of FET Q56. Output node 68 is connected by line 70 to the gate of FET Q57, the output circuit of which is connected between a +12 volt source and output sensing terminal 70'.

For the uniquely addressed column, during $\Phi_2$ time the input to inverter 62 will correspond to the signal at output node 57, which is the memory cell status inverted. If the memory cell is in a logic "1" condition (negative) the input to inverter 62 will be positive, its output on line 64 will be negative, the output driven OR gate 66 will be conductive, and output node 68 will be negative. The converse will obtain if the memory cell is in a logic "0" condition (positive). For the 15 nonuniquely addressed columns, the associated OR gates 66 are cut off, and their output nodes 68 are positive.

A positive signal at node 68 keeps FET Q57 cut off, while a negative signal makes FET Q57 conductive. As a result, during a read cycle, a logic "1" condition in the associated memory cell connects output sensing terminal 70' to +12 volts, while a logic "0" condition will disconnect the two. Thus, during a read cycle, a logic "1" presents a resistance to +12 volts at the sense output, while a logic "0" presents an open circuit. The sense output may be applied to a sense amplifier (not shown). It will be noted that a separate "Read" command is not required for the performance of a read operation,—all that is required is a row-column select input and the absence of a Write command.

REFRESH CYCLE

FIG. 5D illustrates the refresh cycle timing for system I. During the refresh cycle all columns are simultaneously addressed, which requires that all column decoders 30 be enabled, by positively returning column input data signals B0, B1, B2, and B4 to +12 volts. A Refresh command is applied to the gate of FET Q28 in each column decoder 30 to return all the internally generated column signal complements to +12 volts. The row address lines are now controlled by an external refresh counter, such as a shift register (not shown), which advances one count during each refresh cycle. All memory chips 10 are selected during the refresh cycle by externally returning all C inputs and their respective complements to +12 volts.

Figure 4:
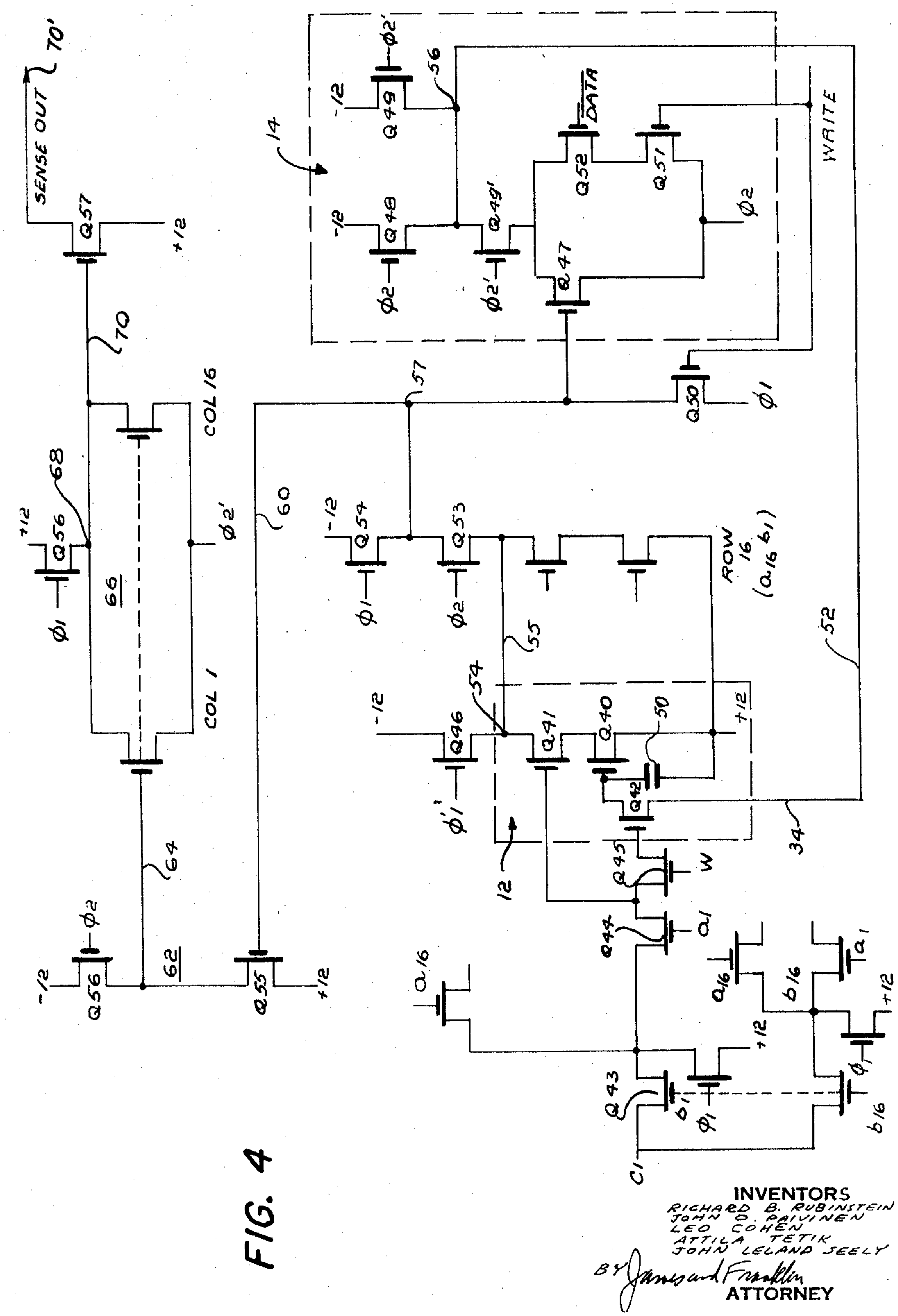
FIG. 4 is a circuit diagram of a section of the system of FIG. 1A illustrating a three device memory cell of this invention, together with the final row and column decoding, refreshing amplifier and output logic circuitry in circuit arrangement with that memory cell.

Referring now to FIG. 4, it will be recalled that a separate refresh amplifier 14 is operatively connected between the outputs and inputs of each of the memory cells 12 in a given column. During each refresh cycle in which one row is addressed, one memory cell in each column is thus addressed and refreshed. The Write line applied to the gate of FET Q51 is at +12 volts, thus disabling the external Data line applied to the gate of FET Q52. If the row $1(a_1)$ memory cells are to be refreshed, addresses $a_1b_1$ through $a_1b_{16}$ are simultaneously addressed. (For clarity of illustration only the $a_1b_1$ address is specifically illustrated in FIG. 4).

The timing for address decoding is similar to that for the previously described read and write operations. The data signal stored on capacitor 50 and thus applied to the gate of FET Q40 is complemented at the output terminal 54 of memory cell 12 and transferred to node 57 during $\Phi_2$ time by Q53, as has been described above for a read operation. That signal is further regenerated and complemented in the refresh amplifier 14 in the manner described above, and appears on the line 52 during $\overline{\Phi_2}\Phi'_2$ time where it is applied in proper phase to capacitor 50 through the output circuit of FET Q42, which is on during $\overline{\Phi_2}\Phi'_2$ time (latter half of $\Phi'_2$ time). Thus data refreshing is sequentially performed on all memory cells by sequentially addressing successive row addresses for each succeeding refresh cycle. Significantly, the refresh operation is performed with the address decoding circuitry and the clock phase signals already available in the chip for read and write operations.

SYSTEM II, GENERAL DISCUSSION

Figure 6:
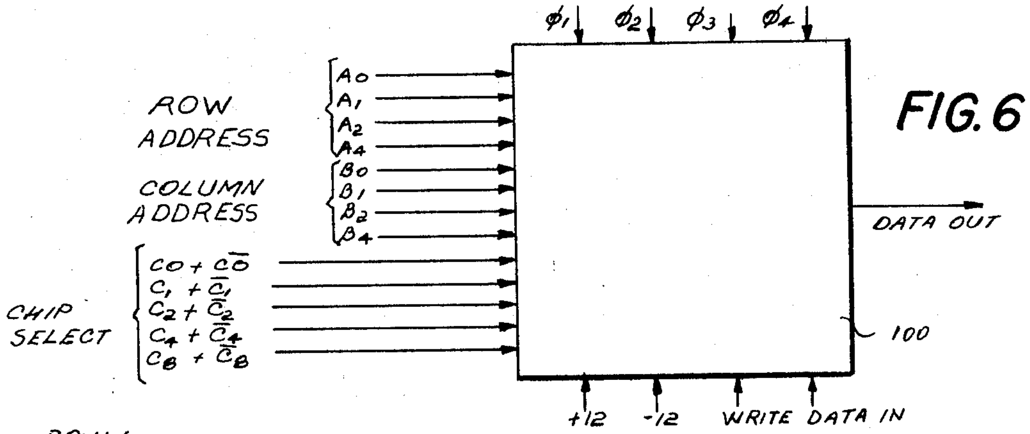
FIG. 6 is a schematic diagram of a second embodiment of the memory system of this invention, indicating the input signals to the system.
Figure 7:
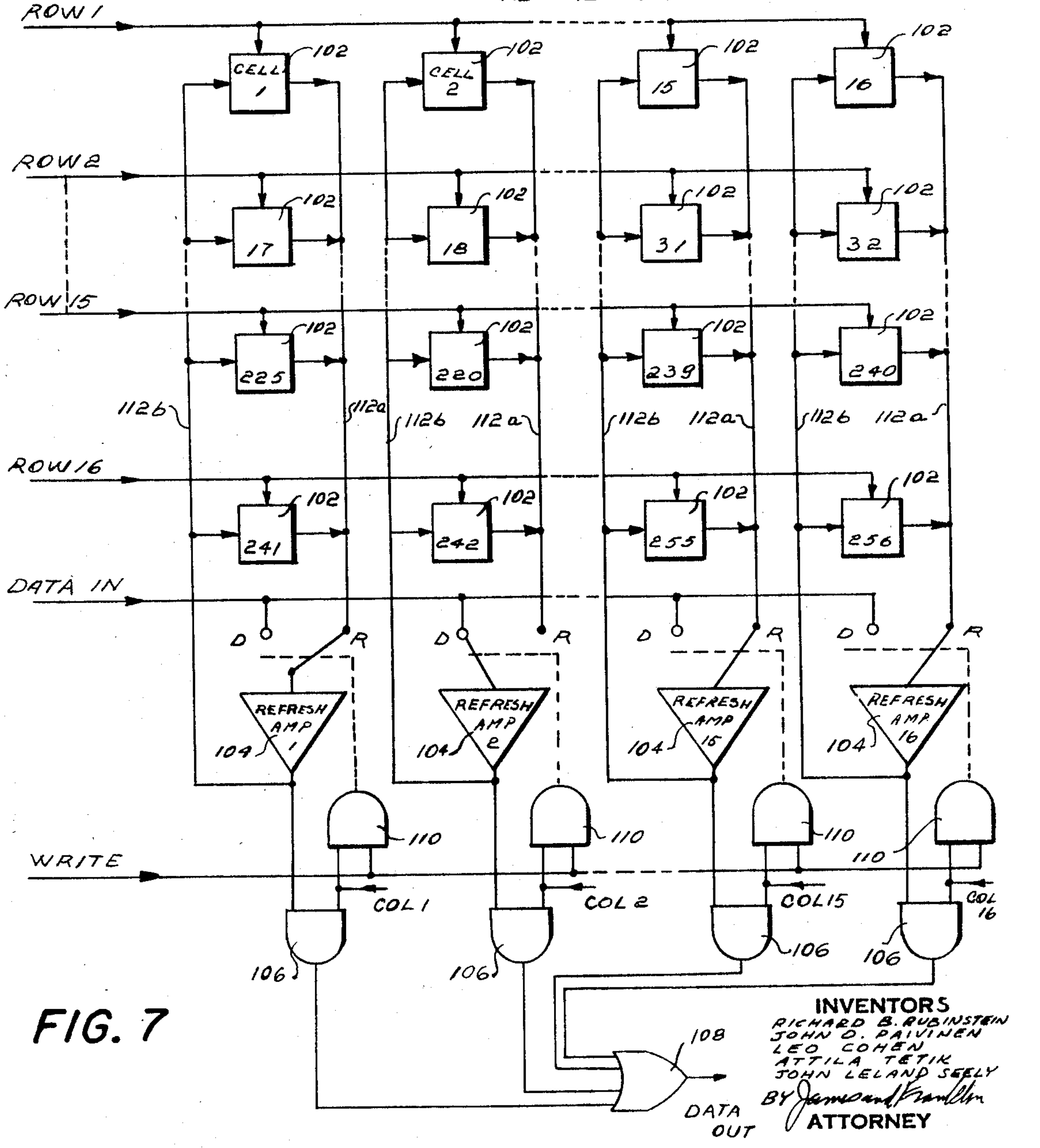
FIG. 7 is a schematic diagram illustrating the row and column arrangement of the memory cells of the memory system of FIG. 6 and the connection of the refresh amplifiers to the various memory cells of that system.

The general organization of system II, illustrated in FIGS. 6 and 7, is substantially the same in many respects as system I. A plurality of word locations or addresses are formed in a single chip 100 of semiconductor material. The word locations each comprise a plurality of individual memory cells arranged in a matrix defined by a plurality of intersecting rows and columns, each word address being defined by a row-column intersection. Chip 100 receives row and column address signals as well as clock signals, potential source signals, write, and Data in signals. If the chip is connected with a plurality of such chips to expand the memory system storage capacity, chip 100 also receives chip select input data signals. To select the proper address corresponding to the address and chip select signals, chip 100 is also provided with row and column decoder circuitry and chip select circuitry. The memory system of system II comprises three element memory cells and refresh amplifiers similar to those used in system I, with variations being provided in these circuits to conform to the different clock phase logic utilized in system II.

One significant distinction between system II and system I is that during a read cycle in system II, all of the memory cells within the selected row are simultaneously and automatically refreshed, and during a write cycle. Information present on the data bit input line is routed or directed to the selected address or location and is stored thereat, while the remaining cells of the selected row are refreshed, the write command signal being effective to block the refresh data from being transferred to that particular memory cell in which new data is then to be written. It will thus be noted that in system II, no separate refresh command signal is required and that there are no particular restrictions on the levels of the column data input signals during a refresh operation as were required in the operation of system I. In system II, as in system I, the refresh operation may be controlled by an external control signal which periodically provides supplementary data refreshing by initiating a series of sequential read operations at specified time intervals, the period between these controlled refresh operations being determined by the data leakage characteristic of the data storing capacitors of the memory cells.

The arrangement of the three-element memory cells 102 in system II and the accompanying logic circuitry is illustrated in FIG. 7 in which the particular embodiment of the disclosed system again comprises 256 memory cells 102 formed on a single chip 100, the cells 102 being arranged in 16 intersecting rows and columns, as in system I. A refresh amplifier 104 is operatively connected to the cells 102 in each column in feedback relation between the outputs **112*a* of these cells and their inputs 112*b*. Output driver circuitry 106 is provided to transfer the read signal to a data output 108, and write logic circuitry 110 is provided in circuit arrangement with each refresh amplifier 104** to transfer the new data input to the addressed cell while blocking the refresh signal from that cell. A novel gating circuit which derives a pair of row command signals from a row select signal is provided in system II to provide the necessary address logic for simultaneous refreshing during the read and write cycles.

CLOCK SYSTEM II

Figure 10:
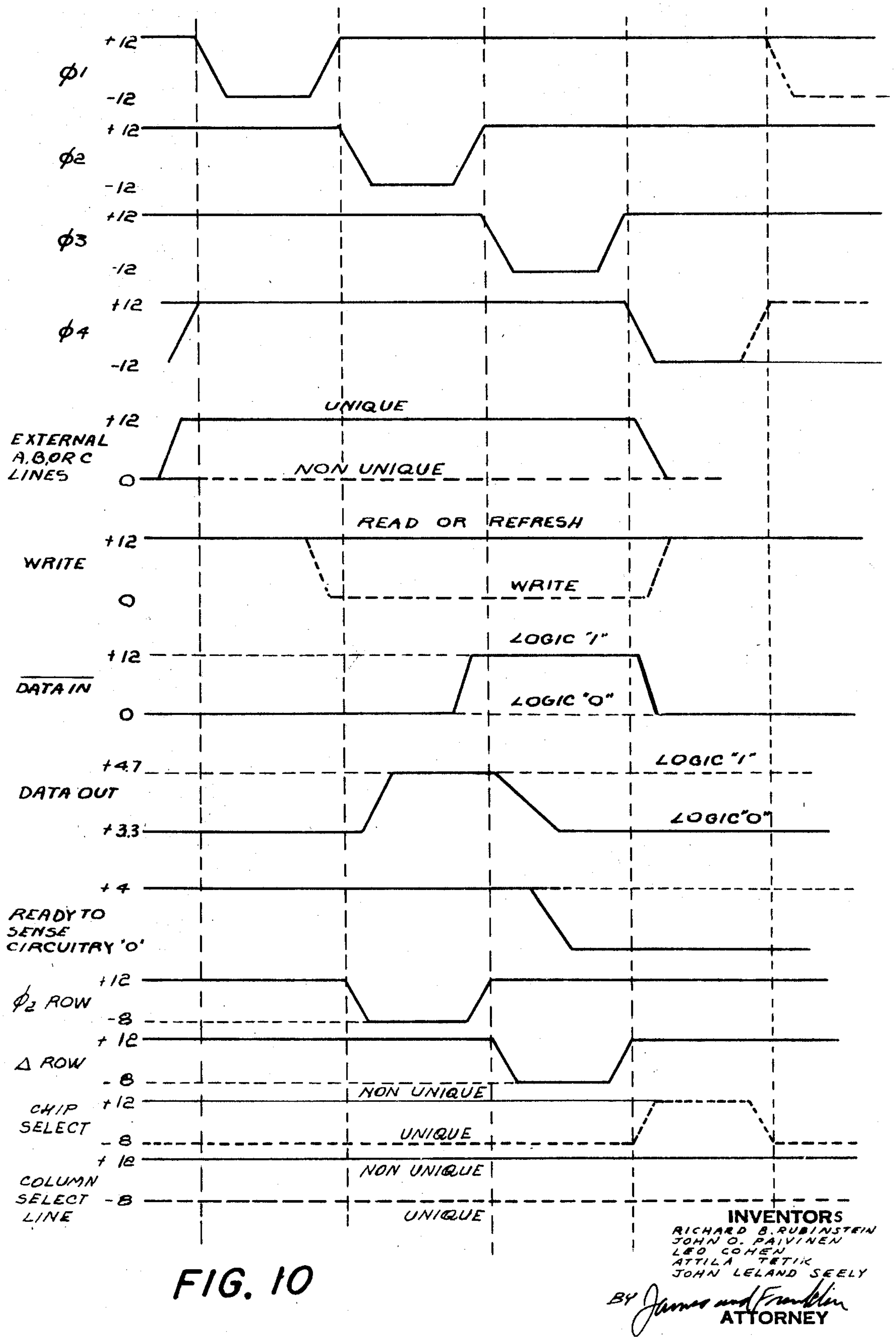
FIG. 10 is a timing diagram illustrating the time relationships between the various input signals utilized in the operation of the system of FIG. 6.

The memory and address select circuitry of system II utilizes a four-phase exclusive clock system, the timing of the clock signals being shown in FIG. 10. These clocks $\Phi_1$, $\Phi_2$, $\Phi_3$, and $\Phi_4$ each have maximum 25percent duty cycles so that the negative portions of the clocks do not overlap. At the start of a new cycle $\Phi_4$ to +12 volts while $\Phi_1$ switches to −12 volts. It should be noted that although system II requires two additional external clock phases, there is no requirement for the Refresh and W commands and the two internal clock generators as in system I.

INITIAL DECODING II

Figure 8A:
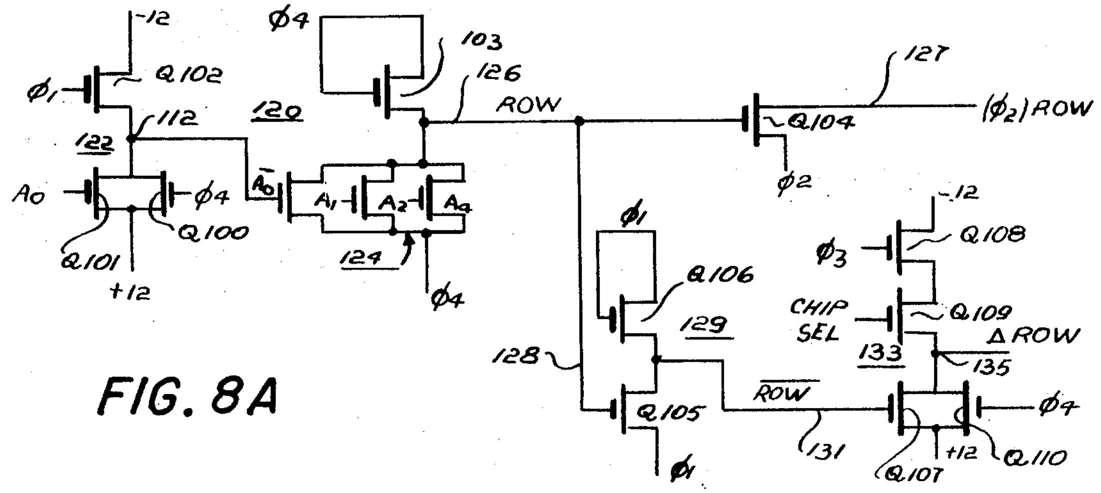
FIG. 8A is a circuit diagram of the row address decoding circuit of the system of FIG. 6.
Figure 8B:
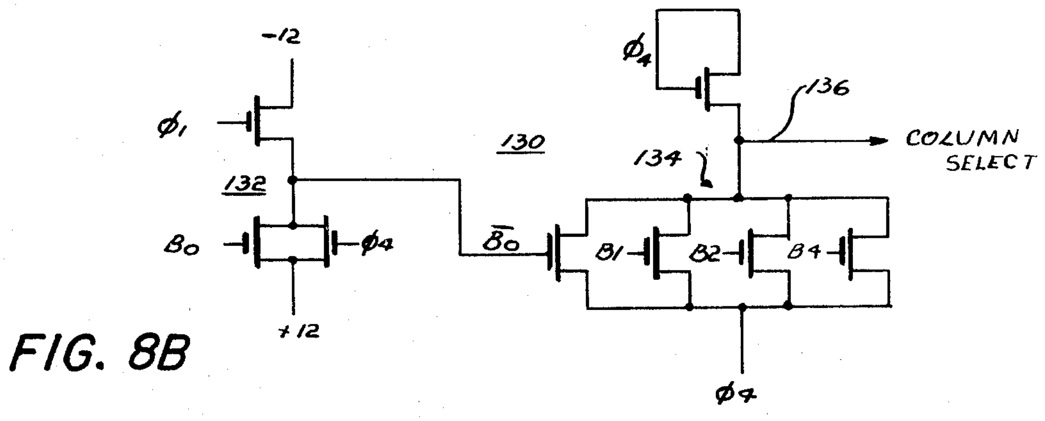
FIG. 8B is a circuit diagram of the column decoding circuit of the system of FIG. 6.
Figure 8C:
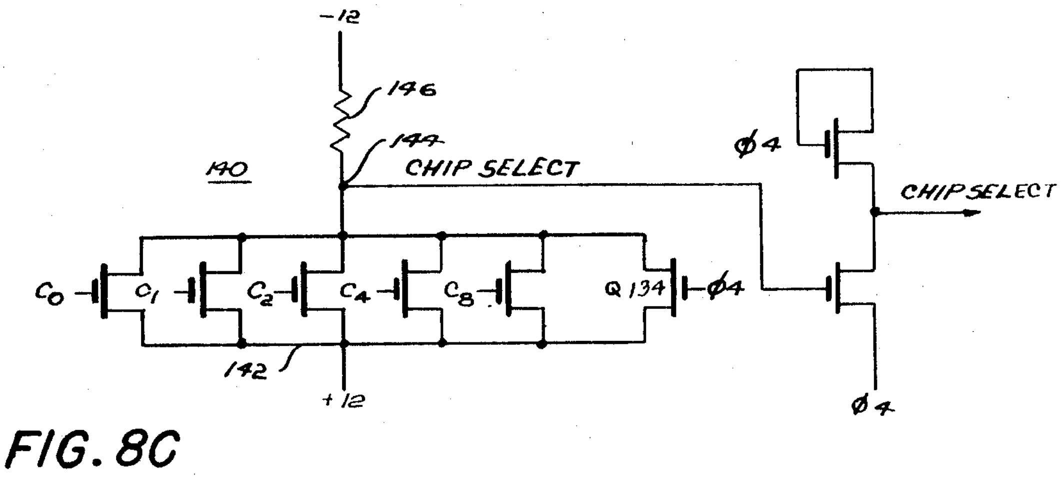
FIG. 8C is a circuit diagram of the chip select decoding circuit of the memory system of FIG. 6.

As in system I, system II comprises 16 row decoders and column decoders for addressing the 256 memory cells, and one *c* decoder for each of the memory chips. The five bit input C lines and their complements all may be made available external to the memory chip 100 and therefore no complementing of the C signals is required on the chip. The initial row, column and chip decoding circuits are shown in FIGS. 8A, 8B and 8C respectively. The *a* and *b* decoders are row and column decoders 120 and 130 respectively, and each comprise a four input NOR gate and circuitry for the complementing input address data. The only time a signal on any of the input address data (row, column, and chip select) lines may change is during $\Phi_4$ time and it must be stable prior to the end of $\Phi_4$ time. The Write command must be stable during $\Phi_2$ and $\Phi_3$ times and the Data input line must be stable during $\Phi_3$ time for a Write cycle (See FIG. 10).

The complementing circuits 122, 132, of row or column decoders 120, 130 are identical in operation and are described with respect only to the row input complementing circuit 122 shown in FIG. 8A. During $\Phi_4$ time node 112 unconditionally charges to +12 volts through FET Q100 while the input A line applied to the control terminal of FET Q101 may be changing and stabilizing to a logic 0(+12 volts) or logic 1 (0 volts) level. At the start of $\Phi_1$ time the A input is stable. If that input is at a logic 1 level FET Q11 is turned on and node 112 is charged to +12 volts through the output circuit of FET Q101 because the on resistance of FET Q101 is designed to be approximately one-tenth that of FEt Q102. If the A input is a logic 0, during $\Phi_1$ time node 112 will charge to within one threshold voltage of $\Phi_1$(approximately −8 volts). It is to be noted that at the start of $\Phi_1$ time all row and column address inputs are stable while all complemented outputs are at +12 volts and can only move negatively if their inputs are logic 0's. The complemented and uncomplemented row and address data are combined in a four input NOR gate 124 (134 in the column decoder 130) which is unconditionally precharged negatively during $\Phi_4$ time by FET Q103. When all the inputs to the NOR gate 124, 134 are +12 volts the output remains negative, thus producing the row (or column) select signal. A zero volt input into any one of the four inputs discharges the output of the NOR gate 124 to +12 volts. The output of the uniquely addressed row and column decoders will therefore remain negative while the remaining row and column decoders discharge to +12 volts during $\Phi_1$ time following that $\Phi_4$ time. The row and column decoder outputs remain stable for all of $\Phi_2$ and $\Phi_3$ time.

In accordance with this invention, the row select output signal on line 126 is further operated on by two gates derived from the system clock signals to generate two additional row signals which, as shall be seen, control the operation of the memory cells during a read and write operation. The row select signal is connected to the control terminal of FET Q104, clock phase $\Phi_2$ being applied to the output circuit of that FET. Upon the operative coincidence of a negative i.e. unique, row select signal and $\Phi_2$ time, a gated $\Phi_2$ Row signal is generated at line 127, which is negative during $\Phi_2$ time and positive for the remainder of a cycle. Similarly the negative row select signal is connected via line 128 to an inverter 129 comprising FET's Q105 and Q106 each having clock phase $\Phi_1$ at their output circuits which generates at node 129 and line 131, at times other than $\Phi_1$ time, a positive $\overline{\text{Row}}$ signal corresponding to the complement of the row select signal. That complemented signal which is connected to the control terminal of FET Q107 of a second gating circuit 133 is effective to generate a second gated signal, derived from the row select signal, which is uniquely negative during $\Phi_3$ time. The other inputs to gating circuit 133 are clock phase $\Phi_3$ applied to the control terminal of FET Q108, and the unique chip select line, derived in a circuit to be described below, which is applied to the control terminal of FET Q109. In the operation of gating circuit 133, node 135 is discharged to +12 volts during $\Phi_4$ time through the output circuit of FET Q110 and is maintained at that level during $\Phi_1$ time. During $\Phi_2$ time the $\overline{\text{Row}}$ signal for the unique row at line 131 is discharged to +12 volts and the chip select line for a selected memory chip will be approximately −10 volts by the start of $\Phi_3$ time. Hence during $\Phi_3$ time both clock phase $\Phi_3$ at the gate of FET Q108 and the chip select line are negative, the selected $\overline{\text{Row}}$ signal is at +12 volts and node 135 is thus pulled negative, thereby to generate at the coincidence of $\Phi_3$ and the selected Row signal, a unique Δ Row signal corresponding to the selected row, which is negative during $\Phi_3$ time and positive for the other clock phases. All unselected Δ Row outputs remain clamped to +12 volts during the entire cycle due to the negative input from their $\overline{\text{Row}}$ lines. The unselected Δ Row gates dissipate DC power only during $\Phi_3$ time for a power dissipation of only 25 percent of the peak power. That DC power, however, is dissipated only on the selected one of the 32 chips per bit position, since the selected chip signal applied to gating circuits 133 on the unselected chips have their chip select lines at +12, thereby blocking any DC path in these gating circuits 133.

The chip select decoder 140 (FIG. 8C) is a five input DC NOR gate 142 whose output at node 144 is uniquely negative only when $\Phi_4$ time is over and simultaneously all chip select or C inputs are at +12 volts and is charged towards +12 volts at $\Phi_4$ time through the output circuit of FET Q134. Thus, the outputs of the chip select decoders 140 of the unselected chips will remain at +12 volts for the entire cycle. A P region resistor 146 may be connected to a −12 volt source and allows the selected chip output to pull highly negative during $\Phi_1$ and $\Phi_2$ times and into $\Phi_3$ time where a high amplitude chip select signal is required. The use of P resistor 146 rather than an MOS transistor as a pullup device allows the output at chip select line node 144 to charge to −12 volts rather than suffering one threshold voltage loss. This results in an extra 4 or 5 volts of drive in the chip select line which allows the selected Δ Row signal, generated in the presence of a negative chip select signal, to achieve a comparable 5 volt improvement which results in additional volts of drive used to deposit charge on the storage element of the memory cell 102, thereby to improve the storage capability and impedance characteristic of that cell.

FINAL DECODING, DATA STORAGE, REFRESHING AND OUTPUT CIRCUITRY

Figure 9:
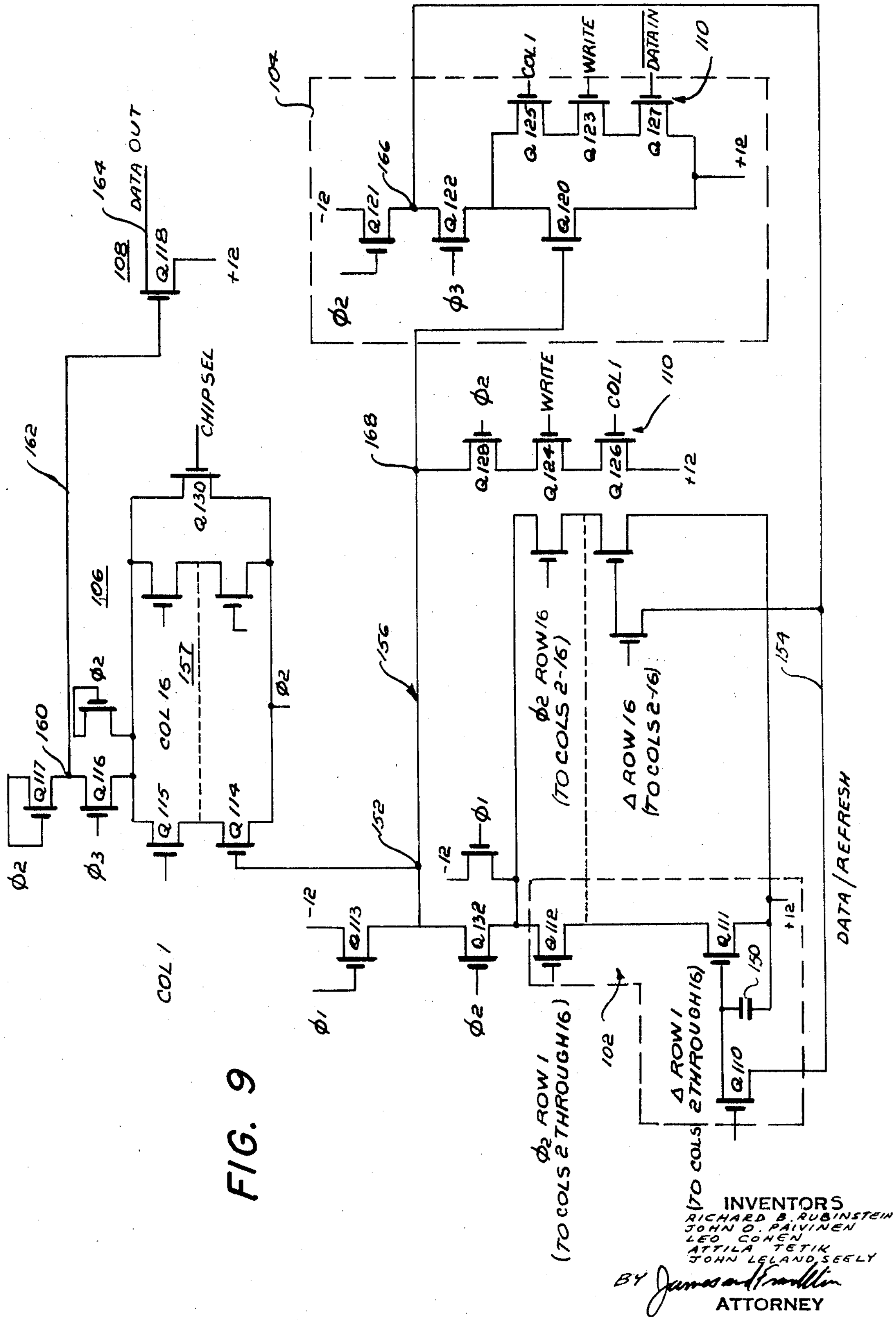
FIG. 9 is a circuit diagram of a section of the system of FIG. 6, illustrating a three-device memory cell and the final row and column decoding, refreshing and output circuitry in circuit arrangement with that memory cell.

FIG. 9 illustrates a typical three FET memory cell 102 used in system II as well as the final decoding, refreshing circuitry 104, and the output driver circuitry 106. Memory cell 102, which is similar to the three-device memory cell 12 of system I comprises three FET's Q110, Q111, and Q112. A data storing capacitor 150 which stores a negative signal for a logic "1" level and is uncharged for a logic "0" level, is connected to the gate of FET Q111. The output circuits of FET's Q111 and Q112 are serially connected between a +12 volt source and an output node 152 through the output circuit of FET Q132. The output circuit of FET Q110 is connected to the gate of FET Q111, and to the data/refresh input line 154. The $\Phi_2$ Row signal is applied to the control terminal of FET Q112, and the control terminal of FET Q110 receives the Δ Row signal. The memory cells 102 are merged at two levels, the first level merging a single cell from each row into a particular column. Thus associated with column I are a single cell from each of rows 1—16. In addition the 16 column outputs are merged in the output driver 106 to provide a single sense output. The signal at output node 152 is connected by line 156 to the input of refresh amplifier 104, the output of which is returned to memory cell 102 by data/refresh line 154.

The operation of system II for read, write and refresh operation is now explained with reference being had to the timing diagrams of FIG. 10.

READ CYCLE

It will be recalled that all nonunique $\Phi_2$ Row and Δ Row lines are at +12 volts for the entire cycle, while the unique $\Phi_2$ Row command is negative during $\Phi_2$ time only and the unique Δ Row command is negative during $\Phi_3$ time only. The unique column select line is negative for all four clock times and the unique chip select line is negative during $\Phi_1$, $\Phi_2$, and $\Phi_3$ times. The Write command is stable at +12 volts during $\Phi_1$, $\Phi_2$, and $\Phi_3$ times, thus inhibiting the input of external data to line 154 (FIG. 10).

It will be assumed that the data signal stored at the address defined by the row 1 column 1 intersection is to be read. The read operation is initiated by terminal 152 precharging negative during $\Phi_1$ time through the output circuit of FET Q113. During $\Phi_2$ time, the $\Phi_2$ Row 1 line is negative, thus causing FET Q112 to be conductive. If the stored signal at capacitor 150 and thus at the gate of FET Q111 is negative, terminal 152 will discharge to +12 volts during $\Phi_2$ time as the +12 volt source is now connected to terminal 152 through the conducting output circuits of FET's Q111, Q112, and Q132, the latter being actuated during $\Phi_2$ time. If the stored word at capacitor 150 is positive, terminal 152 remains negatively charged because FET Q111 is cut off. The signal at terminal 152 is thus the complement of the stored word at capacitor 150. Since the $\Phi_2$ Row 1 and Δ Row 1 commands are applied to the corresponding row 1 switching FET's in all 16 columns, all 16 cells in row 1 are sampled, inverted, and transferred to their corresponding terminal 152 outputs simultaneously during $\Phi_2$ time. In each column, the signal at terminal 152, which is stable by the end of $\Phi_2$, is sampled and inverted at refresh amplifier 104 during $\Phi_3$ time and produces a regenerated signal at output terminal 166 of amplifier 104. The double inversion of the stored word causes the output of amplifier 104 to be in proper phase with the stored word level on capacitor 150.

As the Δ Row 1 line is negative only during $\Phi_3$ time, the regenerated data is strobed back at that time to the memory cell 102 in phase with the original data via the Data/Refresh line 154 through the output circuit of FET Q110, the latter being turned on by the Δ Row signal applied to its gate. At the end of $\Phi_3$ time, FET Q110 is once again cut off and the data storage capacitor 150 is again isolated from line 152. As each memory cell in the selected row receives the $\Phi_2$ Row and Δ Row signals during $\Phi_2$ and $\Phi_3$ times respectively, all the memory cells 102 in that selected row in all 16 columns are thus automatically and simultaneously refreshed during a read operation.

The 16 column outputs from terminal 152 in the selected row are merged in the output driver circuitry 106. In order for the unique row 1 column 1 location to be read at the data output 108 the 16 column outputs are gated with the column select signal. The selected column 1 signal is uniquely negative while the remaining column select signals are at +12 volts during $\Phi_2$ and $\Phi_3$, thus blocking their column inputs in driver 106. The output of memory cell 102 at terminal 152, which is the complement of the data signal stored on capacitor 150, is applied to the input of output driver 106 at the control terminal of FET Q114. The uniquely negative column 1 select signal is applied to the control terminal of FET Q115 defining one input gate of a 16 input gate NOR circuit 157—FET Q115 is thus rendered conductive, thereby to connect the output circuit of FET Q114 to the output circuit of FET Q116 which is conductive during $\Phi_3$ time, so that at that time, the selected column output at terminal 152 is connected to the output terminal 160 of output driver 106. Terminal 160 is precharged negatively during $\Phi_2$ time through the output circuit of FET Q117. During $\Phi_3$ time the terminal 152 signal associated with the selected column 1 is thus sampled and inverted, the output being stable for all of $\Phi_4$ and $\Phi_1$ times. Thus, for the selected chip the signal at terminal 160 is connected via line 162 to the control terminal of the output data FET Q118.

Refresh amplifier 104 of system II comprises an input switch device in the form of FET Q120 receiving the signal from terminal 152 at its control terminal. The output terminal 166 of amplifier 104 is charged negatively during $\Phi_2$ time through the output circuit of FET Q121, and a +12 volt line is applied to the output circuit of FET Q120. FET Q122, receiving clock phase $\Phi_3$ at its control terminal, has its output circuit serially connected with the output circuit of FET Q120 and output terminal 166. In operation a negative signal applied to the control terminal of FET Q120 during $\Phi_3$ time connects the +12 line to terminal 166 through the output circuits of FET's Q120 and Q122, thereby to charge terminal 166 positive. If the input signal to FET Q120 is positive, FET Q120 is cut off, so that terminal 166 remains charged negative. Thus, amplifier 104 produces at terminal 166 the inverse of the signal at the output of memory cell 102 at a level corresponding to the nominal level of that signal. The amplifier output signal at terminal 166 is connected during $\Phi_3$ time (ΔRow time only occurs during $\Phi_3$ time) through line 154 to and through the output circuit of FET Q110 to the data storing capacitor 150 in memory cell 102.

WRITE CYCLE

A write cycle is essentially identical to a read cycle with one significant exception, in that the presence of a Write command prevents the old data in the addressed row—column location from being regenerated, while transferring the new data into the cell. However, the remaining 15 cells in the selected row still will be automatically and simultaneously refreshed. During a write cycle, FET's Q123 and Q124 receive the negative write command at their control terminals during $\Phi_2$ and $\Phi_3$ times and are turned on. FET's Q125 and Q126, whose output circuits are serially connected with those of FET's Q123 and Q124 respectively, receive the uniquely negative column select signal at their control terminals, and FET Q127 whose output circuit is in series with that of FET's Q123 and Q125, has the complement of the Data in signal applied to its control terminal FET Q128, whose output circuit is in series with the output circuits of FET's Q124 and Q126 and the input of amplifier 104, has clock phase $\Phi_2$ applied to its control terminal. FET's Q123—Q128 thus define the write logic circuitry 110. In operation, for a selected column the presence of a write signal at the input of Q124 turns that device on, and during $\Phi_2$ time applies a +12 volt signal at node 168, thus effectively clamping point 168 at that potential so as to effectively block the transmission path of the column output signal at terminal 152 of the selected column to the input switching FET Q120 of amplifier 104. The remaining memory cells in the selected row are unaffected by the Write cycle and their outputs continue to be applied to their refresh amplifiers and returned to their inputs as in a read operation. At the same time, a negative $\overline{\text{Data}}$-in signal, applies a +12 volt signal at terminal 166 of amplifier 104 and thus to line 152. A positive $\overline{\text{Data}}$-in signal at the control terminal of FET Q127 cuts off the latter so that output 166 maintains its initial negative signal which is applied via line 154 to the storage capacitor 150. Thus a new data signal is inserted into the selected memory cell, while the remaining cells in that selected row are simultaneously and automatically refreshed.

REFRESH CYCLE II

During an externally controlled refresh cycle the storage capacitors in an entire row are regenerated, the rows being sequentially addressed by an external refresh counter (not shown) for successive refresh operations. The row addressing during a refresh cycle is controlled by an external refresh counter (not shown) which advances one count during each refresh cycle thereby to refresh the memory cells in a new row in each refresh cycle.

The system refresh cycle is identical to a read operation with respect to chip timing. The only difference in terms of system performance is the need to simultaneously select all chips. This requires that the trues and complements of the 5-bit external C lines be at +12 volts for all of $\Phi_1$, $\Phi_2$, and $\Phi_3$ times during a refresh operation.

SUMMARY

The present invention provides a memory system of the type that can be readily fabricated on a single chip or chips of semiconductive material and is thus able to store a large number of binary words in a relatively small volume. The memory system of this invention is also able to operate at relatively low power dissipation as a result of the reduced number of switching elements and the use of sequential clock pulses as potential signals for much of its operation, thus minimizing the DC power dissipation of the system.

The memory system of this invention is of that type in which the data word is stored on a capacitive storing element associated with each of the memory cells, that storage element having the characteristic that the data signal tends to dissipate therefrom so that periodic refreshing of the storing element is required. The system of the present invention provides an effective means for performing the necessary data refreshing which makes use of the existing address decoding circuitry and clock signals which are already available in the memory system for normal addressing operations. As a result no additional circuitry is required for data refreshing in system II, while for data refreshing in system I only a minor addition is required to the column decoding circuitry. An external refresh counter is required in system I. However, if memory system II is sequentially addressed during its normal read operations, all of the memory cells will be automatically refreshed during these addressing operations, and in that event no external refresh cycle is required. For random access operation of system II there may be cells which are not addressed and thus not refreshed; under those circumstances the externally controlled refreshing operation will still be required to ensure complete data refreshing.

A further advantage of system II is that a sequentially controlled refresh operation may be effected even in the event of a failure of the DC power source to the memory system by providing an auxiliary trickle charge battery having low power dissipation which provides a reduced level DC supply to the refresh circuitry suitable for data refreshing and then by performing sequential data refresh operations on the system. In this manner, the stored data will be maintained at the memory cells at operative levels for an indefinite period until the external power source is once again in operation.

The present invention also provides a novel three element memory cell for repeated use in a memory system in which the number of such switch devices required for each memory cell is reduced, thus increasing the number of memory cells and thus the number of word locations that can be contained in a given volume of chip material, while still maintaining the necessary signal isolation between these switching devices. Also provided as an improved refresh amplifier connected between the outputs and inputs of the memory cells during a refresh operation, and which operates as an AC device, thereby minimizing power dissipation. The refresh amplifier requires a minimum number of switching devices and is controlled by the timing clock signals normally provided in the system for general system operation.

While only two embodiments of the invention have been herein specifically disclosed, it will be apparent than many variations will be made therein all within the scope of the invention as defined in the following claims:

We claim:

1. In combination with a memory system comprising a plurality of memory units, each of said units having a unique address, each of said memory units comprising a data signal input, a data signal output, data storing means having the characteristic that a data signal level thereof tends to dissipate therefrom, and address signal means operatively connected to said units and effective when actuated to provide signals to selectively enable the corresponding units to receive a data signal from its input and to transfer a data signal to its output; data refresh means comprising amplifier means connected in feedback relation between the outputs of said units and their inputs, and refresh control means effective when actuated to actuate said data refresh means to feedback unit data outputs to inputs and to use the existing address signal means to select the memory units to be thus acted upon.

2. The combination of claim 1, comprising means for actuating said refresh control means, and means for energizing said actuating means at predetermined intervals.

3. The combination of claim 2, in which said memory units are arranged in a plurality of groups, refresh control means in a given refresh operation actuating the address signal means of all of said units in a different group, said refresh control means on the next refresh operation actuating the address signal means of all of said units in a different group, and so on until the address signal means of said units in all of said groups have been thus actuated.

4. The combination of claim 2, in which said memory units are arranged in a matrix defined by a plurality of intersecting lines of first and second types, there being a separate amplifier means for the storage units of each line of said first type, said address signal means being responsive to signals for said first and second types of lines, thereby to define said unique address, said refresh control means on a given refresh operation providing signals for all of said lines of said first type and only one of said lines of said second type, said refresh control means on the next refresh operation providing signals for all of said lines of said first type and a different one of said lines of said second type, and so on until signals for all of said lines of said second type have been provided.

5. The combination of claim 1, in which said memory units are arranged in a plurality of groups, refresh control means in a given refresh operation actuating the address signal means of all of said units in a given group, said refresh control means on the next refresh operation actuating the address signal means of all of said units in a different group, and so on until the address signal means of said units in all of said groups have been thus actuated.

6. The combination of claim 1, in which said memory units are arranged in a matrix defined by a plurality of intersecting lines of first and second types, there being a separate amplifier means for the storage units of each line of said first type, said address signal means being responsive to signals for said first and second types of lines, thereby to define said unique address, said refresh control means on a given refresh operation providing signals for all of said lines of said first type and only one of said lines of said second type, said refresh control means on the next refresh operation providing signals for all of said lines of said first type and a different one of said lines of said second type, and so on until signals for all of said lines of said second type have been provided.

7. The combination of claim 2, in which said memory units are arranged in a plurality of intersecting lines of two types, said control means comprising line select means effective to enable all of said units in a selected line and to transfer said data from said enabled units through amplifier means respectively associated therewith to said storing means of each of said selected units in said selected line.

8. The combination of claim 7, in which said line select means comprise a pair of spaced timed signals each derived from an external line address signal, said units each comprising a pair of switch means, each of the latter respectively receiving and being actuated by a respective one of said timed signals.

9. The combination of claim 1, in which said memory units are arranged in a plurality of intersecting lines of two types, said control means comprising line select means effective to enable all of said units in a selected line and to transfer said data from said enabled units through amplifier means respectively associated therewith to said storing means of each of said selected units in said selected line.

10. The combination of claim 9, in which said line select means comprise a pair of spaced timed signals each derived from an external line address signal, said units each comprising a pair of switch means, each of the latter respectively receiving and being actuated by a respective one of said timed signals.

11. A memory unit comprising a data input terminal, a data output terminal, capacitive data storing means, a reference potential source, and first, second, and third switching devices each having an output circuit and a control terminal, the output circuits of said first and second switching devices being connected in series between said potential source and said output terminal, said capacitive data storing means being connected between said potential source and the control terminal of said first switching device, the output circuit of said third switching device being connected between said input terminal and the control terminal of said first switching device, the control terminals of said second and third switching devices being adapted to be connected to sources of timed control signals.

12. The memory unit of claim 11, in which said switching devices are field effect transistors having a gate defining said control terminal.

13. The memory unit of claim 12, in which said data storing means comprises a capacitor distinct from said first switching device.

14. The memory unit of claim 13, in which the data stored on said data storing means is nominally at one of two distinct voltage levels, one of said levels causing said first switching device to be conductive, thereby to transfer said reference potential to the output circuit of said second switching device, the other data level causing said first switching device to be nonconductive, thereby to fail to thus transfer said reference potential.

15. The memory unit of claim 11, in which said data storing means comprises a capacitor distinct from said first switching device.

16. The memory unit of claim 11, in which the data stored on said data storing means is nominally at one of two distinct voltage levels, one of said levels causing said first switching device to be conductive, thereby to transfer said reference potential to the output circuit of said second switching device, the other data level causing said first switching device to be nonconductive, thereby to fail to thus transfer said reference potential.

17. In combination with a memory system comprising a plurality of memory units comprising means for storing a data signal and having the characteristic that said data signal tends to dissipate, and means for selecting only a single given memory unit and performing an intelligence function (e.g. read or write) thereon; refreshing means effective when actuated to sense the data signal on a given unit and to restore it to proper value, means for determining when an intelligence function is performed on said memory unit, and means for actuating said refreshing means associated with a plurality of memory units when a performance of an intelligence function on said memory unit is determined.

18. The combination of claim 17, in which said memory units are arranged in a plurality of lines, said actuating means being effective when the performance of an intelligence function of a particular type on said single memory unit in a given line is sensed to actuate the refreshing means associated with all of the other memory units in said given line as well as the refreshing means associated with the memory unit on which said intelligence function is performed.

19. The combination of claim 18, in which said intelligence function of particular type is a read function.

20. The combination of claim 17, in which said memory units are arranged in a plurality of lines, said actuating means being effective when the performance of an intelligence function on said single memory unit in a given line is sensed to actuate the refreshing means associated with all of the other memory units in said given line.

21. The combination of claim 20, in which said intelligence function is a write function, said actuated refreshing means being those associated only with the other memory units in said given line.

22. The combination of claim 18, in which said actuating means comprises signal means derived from said unit selecting means.

23. The combination of claim 22, in which said memory unit comprises an input and an output, said refreshing means comprises amplifier means interposed between said unit output and input, said signal means being effective to transfer said data signal from said storing means through said amplifier means to said unit input.

24. The combination of claim 23, comprising means responsive to a write function signal and effective to transfer a data signal to said selected unit and to block the transfer of said data signal from said selected unit to said amplifier means so as not to refresh said selected unit.

25. The combination of claim 24, in which said actuating means comprises a pair of unique timed signals, the earlier of said signals being effective to transfer said data signal to the input of said amplifier means, the later of said signals being effective to transfer to said storing means (a) the output of said amplifier means in said read function, and (b) a data signal in said write function.

26. The combination of claim 17, in which said memory unit comprises an input and an output, said refreshing means comprises amplifier means interposed between said unit output and input, said signal means being effective to transfer said data signal from said storing means through said amplifier means to said unit input.

27. The combination of claim 18, in which said memory unit comprises an input and an output, said refreshing means comprises amplifier means interposed between said unit output and input, said signal means being effective to transfer said data signal from said storing means through said amplifier means to said unit input.

28. The combination of claim 27, comprising means responsive to a write function signal and effective to transfer a data signal to said selected unit and to block the transfer of said data signal from said selected unit to said amplifier means so as not to refresh said selected unit.

29. The combination of claim 28, in which said memory unit comprises switch means having a control terminal and an output circuit, said storing means and said amplifier means being connected to said output circuit, said control terminal being connected to said actuating means so as to be actuated thereby to transfer the output of said amplifier means to said storing means.

30. The combination of claim 29, in which said actuating means comprises a pair of unique timed signals, the earlier of said signals being effective to transfer said data signal to the input of said amplifier means, the later of said signals being effective to transfer to said storing means (a) the output of said amplifier means in said read function, and (b) a data signal in said write function.

31. The combination of claim 26, in which said actuating means comprises a pair of unique timed signals, the earlier of said signals being effective to transfer said data signal to the input of said amplifier means, the later of said signals being effective to transfer to said storing means (a) the output of said amplifier means in said read function, and (b) a data signal in said write function.

32. The combination of claim 27, in which said actuating means comprises a pair of unique timed signals, the earlier of said signals being effective to transfer said data signal to the input of said amplifier means, the later of said signals being effective to transfer to said storing means (a) the output of said amplifier means in said read function, and (b) a data signal in said write function.

33. In a memory system comprising a plurality of memory units, each of said units comprising data storing means for storing a first or second signal thereon nominally at first and second voltage levels respectively, and having the characteristic that the data signal tends to dissipate, said units also each comprising an output and an input; feedback amplifier means operatively connected between said unit output and said unit input, said amplifier means having an output operatively connected to said unit input, first and second signal sources respectively providing signals at said first and second voltage levels, switch means for selectively operatively connecting said first and second signal sources to said amplifier output, and controlling means operatively connected between said switch means and said unit output, said controlling means being effective to actuate said switch means to operatively connect to said amplifier output that one of said signal sources corresponding to that one of said data signals then applied at said unit output.

34. The amplifier of claim 33, in which said switch means comprises first, second and third switches, said first switch being interposed between said first signal source and said amplifier output, said second and said third switches being serially interposed between said second signal source and said amplifier output, said controlling means comprising a connection between said unit output and said second switch and further comprising clock means operatively connected to said first and third switches and effective to render them alternatively conductive.

35. The memory unit of claim 12 in which said data storing means comprises the interelectrode capacitance of said first switching device.

36. The memory unit of claim 11 further comprising data refresh means comprising an amplifier connected in feedback relation between said output terminal and said input terminal and adapted to feed back the signal at said output terminal to said input terminal.

37. The memory unit of claim 35 further comprising data refresh means connected in feedback relation between said output terminal and said input terminal and adapted to feed back the signal at said output terminal to said input terminal.

38. The memory unit of claim 36 in which said amplifier comprises an input terminal, an output terminal, a reference potential source defining first and second reference voltages, and fourth, fifth, sixth, and seventh switching devices each having an output circuit and a control terminal, the output circuits of said fourth, fifth and sixth switching devices being connected in series across said reference potential source, said seventh switching device being connected between said first reference voltage and said amplifier input terminal, the control terminal of said fourth switching device being connected to said amplifier input terminal, said amplifier output terminal being defined between the output circuits of said fifth and sixth switching devices, the control terminals of said fifth, sixth and seventh switching devices being adapted to be connected to sources of timed control signals.

39. The memory unit of claim 38, wherein the output circuit of said sixth switching device is connected between said first reference voltage and said amplifier output terminal, the output circuits of said fourth and fifth switching devices being connected in series between said amplifier output terminal and said second reference voltage.

40. The memory unit of claim 39 wherein the output circuit of said sixth switching device is connected between said first reference voltage and said output terminal, the output circuits of said fourth and fifth switching devices being connected in series between said output terminal and said second reference voltage.

41. The memory unit of claim 40, wherein said timed control signals applied to the control terminals of said fifth and sixth switching devices are nonoverlapping.

42. The memory unit of claim 38, wherein said timed control signals applied to the control terminals of said fifth and sixth switching devices are nonoverlapping.

43. A memory system comprising a plurality of the memory units of claim 11 arranged in a matrix defined by a plurality of intersecting lines of first and second types, each unit having a unique address defined by the intersection of a line of said first type with a line of said second type, and address signal means operatively connected to said control terminals of said second and third switching devices and effective to selectively enable said units to receive a signal from its input terminal and to transfer data to its output terminal.

44. A memory system comprising a plurality of the memory units of claim 35 arranged in a matrix defined by a plurality of intersecting lines of first and second types, each unit having a unique address defined by the intersection of a line of said first type with a line of said second type, and address signal means operatively connected to said control terminals of said second and third switching devices and effective to selectively enable said units to receive a signal from its input terminal and to transfer data to its output terminal.

45. A memory system comprising a plurality of the memory units of claim 36 arranged in a matrix defined by a plurality of intersecting lines of first and second types, each unit having a unique address defined by the intersection of a line of said first type with a line of said second type, and address signal means operatively connected to said control terminals of said second and third switching devices and effective to selectively enable said units to receive a signal from its input terminal and to transfer data to its output terminal, one of said amplifiers serving as the data refresh means for all of the memory units in one line of said first type.

46. A memory system comprising a plurality of the memory units of claim 37 arranged in a matrix defined by a plurality of intersecting lines of first and second types, each unit having a unique address defined by the intersection of a line of said first type with a line of said second type, and address signal means operatively connected to said control terminals of said second and third switching devices and effective to selectively enable said units to receive a signal from its input terminal and to transfer data to its output terminal, one of said amplifiers serving as the data refresh means for all of the memory units in one line of said first type.

47. A memory system comprising a plurality of the memory units of claim 38 arranged in a matrix defined by a plurality of intersecting lines of first and second types, each unit having a unique address defined by the intersection of a line of said first type with a line of said second type, and address signal means operatively connected to said control terminals of said second and third switching devices and effective to selectively enable said units to receive a signal from its input terminal and to transfer data to its output terminal, one of said amplifiers serving as the data refresh means for all of the memory units in one line of said first type.

48. A memory system comprising a plurality of the memory units of claim 39 arranged in a matrix defined by a plurality of intersecting lines of first and second types, each unit having a unique address defined by the intersection of a line of said first type with a line of said second type, and address signal means operatively connected to said control terminals of said second and third switching devices and effective to selectively enable said units to receive a signal from its input terminal and to transfer data to its output terminal, one of said amplifiers serving as the data refresh means for all of the memory units in one line of said first type.

49. A memory system comprising a plurality of the memory units of claim 40 arranged in a matrix defined by a plurality of intersecting lines of first and second types, each unit having a unique address defined by the intersection of a line of said first type with a line of said second type, and address signal means operatively connected to said control terminals of said second and third switching devices and effective to selectively enable said units to receive a signal from its input terminal and to transfer data to its output terminal, one of said amplifiers serving as the data refresh means for all of the memory units in one line of said first type.

50. A memory system comprising a plurality of the memory units of claim 41 arranged in a matrix defined by a plurality of intersecting lines of first and second types, each unit having a unique address defined by the intersection of a line of said first type with a line of said second type, and address signal means operatively connected to said control terminals of said second and third switching devices and effective to selectively enable said units to receive a signal from its input terminal and to transfer data to its output terminal, one of said amplifiers serving as the data refresh means for all of the memory units in one line of said first type.

51. A memory system comprising a plurality of the memory units of claim 42 arranged in a matrix defined by a plurality of intersecting lines of first and second types, each unit having a unique address defined by the intersection of a line of said first type with a line of said second type, and address signal means operatively connected to said control terminals of said second and third switching devices and effective to selectively enable said units to receive a signal from its input terminal and to transfer data to its output terminal, one of said amplifiers serving as the data refresh means for all of the memory units in one line of said first type.

52. The memory unit of claim 36, in which said amplifier comprises a reference potential source defining first and second reference voltages, fourth, fifth, sixth and seventh switching devices each having a control terminal and an output circuit, the output circuits of said fourth, fifth, and sixth switching devices being connected in series across said reference potential source, the output circuit of said seventh switching device being connected between said output terminal of said memory unit and the control terminal of said sixth switching device, the output circuit of said fourth switching device being connected between said first reference voltage and said data input terminal of said memory unit, the control terminals of said fourth, fifth and seventh switching devices being adapted to be connected to sources of time control signals.

53. The memory unit of claim 52 further comprising an eighth switching device having its output circuit connected between said first reference voltage and the data output terminal of said memory unit.

54. The memory unit of claim 52, further comprising ninth and tenth switching devices having their output circuits connected in series with each other but in parallel with said sixth switching device, said ninth and tenth switching devices adapted to receive new data signals and write command signals.

55. The memory unit of claim 53, further comprising ninth and tenth switching devices having their output circuits connected in series with each other but in parallel with said sixth switching device, said ninth and tenth switching devices adapted to receive new data signals and write command signals.